US009575731B1

(12) United States Patent
Peng

(10) Patent No.: US 9,575,731 B1
(45) Date of Patent: Feb. 21, 2017

(54) DIAGRAM LANGUAGE FOR COMPUTER PROGRAMMING

(71) Applicant: Chaorong Peng, Selma, NC (US)

(72) Inventor: Chaorong Peng, Selma, NC (US)

(73) Assignee: Chaorong Peng, Selma, NC (US)

( * ) Notice: Subject to any disclaimer, the term of this patent is extended or adjusted under 35 U.S.C. 154(b) by 0 days.

(21) Appl. No.: 14/745,817

(22) Filed: Jun. 22, 2015

(51) Int. Cl.
*G06F 9/44* (2006.01)

(52) U.S. Cl.
CPC ...................... *G06F 8/31* (2013.01)

(58) Field of Classification Search
None
See application file for complete search history.

(56) References Cited

U.S. PATENT DOCUMENTS

| | | | |
|---|---|---|---|
| 5,812,852 A | 9/1998 | Poulsen et al. | |
| 6,002,874 A | 12/1999 | Bahrs et al. | |
| 6,031,993 A | 2/2000 | Andrews et al. | |
| 6,275,976 B1 | 8/2001 | Scandura | |
| 6,317,871 B1 | 11/2001 | Andrews et al. | |
| 6,317,873 B1 | 11/2001 | Townsend | |
| 6,360,359 B1 | 3/2002 | Matsuo | |
| 6,467,079 B1 | 10/2002 | Ettritch et al. | |
| 6,523,171 B1 | 2/2003 | Dupuy et al. | |
| 7,240,338 B1 | 7/2007 | Bell et al. | |
| 7,386,840 B1 | 6/2008 | Cockerham et al. | |
| 8,510,647 B2 | 8/2013 | Madden | |

*Primary Examiner* — Craig Dorais

(57) ABSTRACT

Embodiments of the present invention is Diagram Language (DL) that uses models as diagrams to represent Keyword Structure Definition (KSD) or Function Structure Definition (FSD) that are used in tradition High Level Language (HLL) such as C++; The diagrams are parallel and distribution formation to indicate that KSD or FSD relationship in diagrams; Diagram-to-diagram, diagram-to-text and text-to-diagram in 3D that transformation are used on typically analyzed to find out properties of the diagrams subject, or transformation to constructor other types of diagrams in the DL; The object with specify characters is to be freely random walk in database; Compile programming recognize diagram information with DL-code to process program; The DL is used on the general HLL that can be implemented to allow DL and another software programs communication with each other.

11 Claims, 25 Drawing Sheets

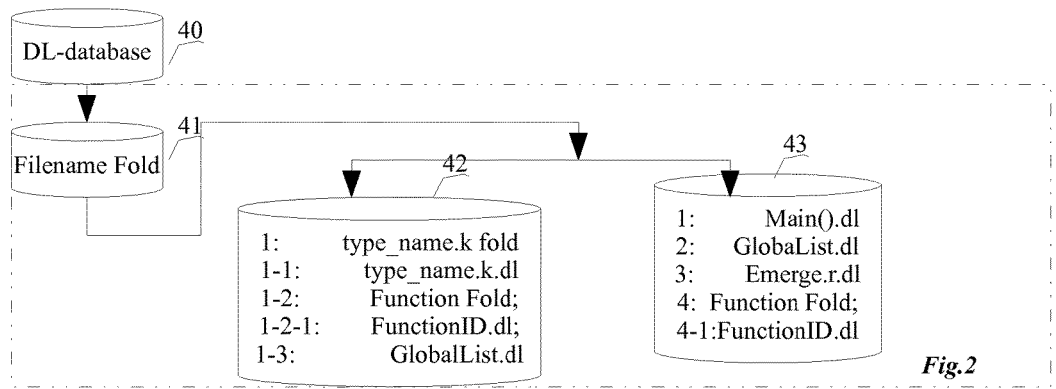

Fig.2

| Determiantion DL-type_name 50 | | 51 |
|---|---|---|
| 1: DL-type_name | 2: C++statement: keywor type_name{}; | 3: linkType[k]: |
| 1-1: type_name.k | 2-1:Keyword type_name{}object; | 3-1: path/to/type_name.k/type_name.k.dl |
| 1-2: ♂object.k | 2-2:Keyword {}object; | 3-2: path/to/♂object.k/♂object.k.dl |
| 1-3: ♂♂.k | 2-3:Keyword type_name{ Keywor {};}; | 3-3: path/to/type_name.k/ ♂♂.k/♂♂.k.dl |

Fig.3

| Definition Identity 60 | | 61 |
|---|---|---|
| 1:Location of DL-statement: an object is declared with its DL-type_name | 2: ^Identity(Id) | 3:linktype[id] |
| 1-1:in GlobalList.dl | 2-1: ^g | 3-1: linkType[g] is /path/to/ GlobalList.dl (35 Fig.2) |
| 1-2:In begaining-dgm or in DL-statement-dgm of FunctionID.dl | 2-2: ^l or ^ | 3-2: linkType[I] is none mean no linkType[I] EXIST |
| 1-3:In type_name.k.dl file | 2-3: ^k | 3-3: linktype[k] is /path/to/type_name.k.dl |

Fig.4

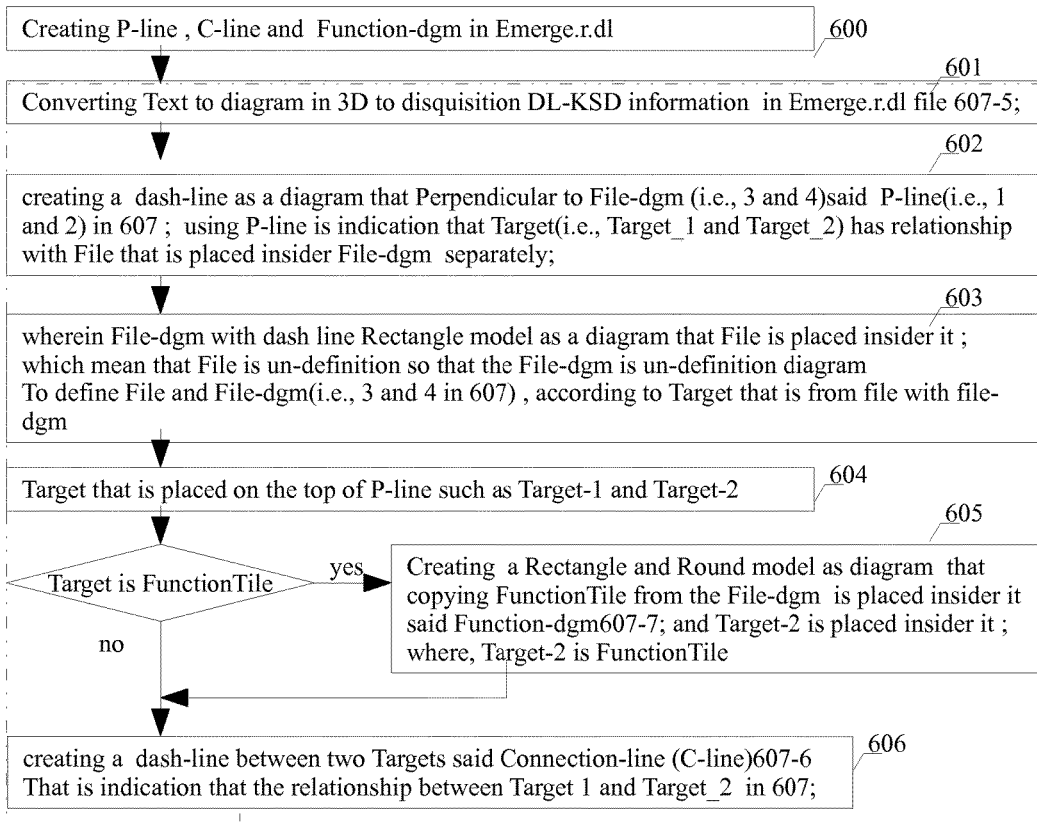
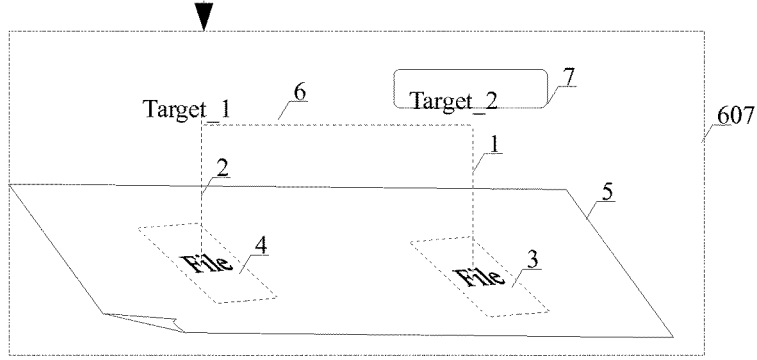
Fig.29

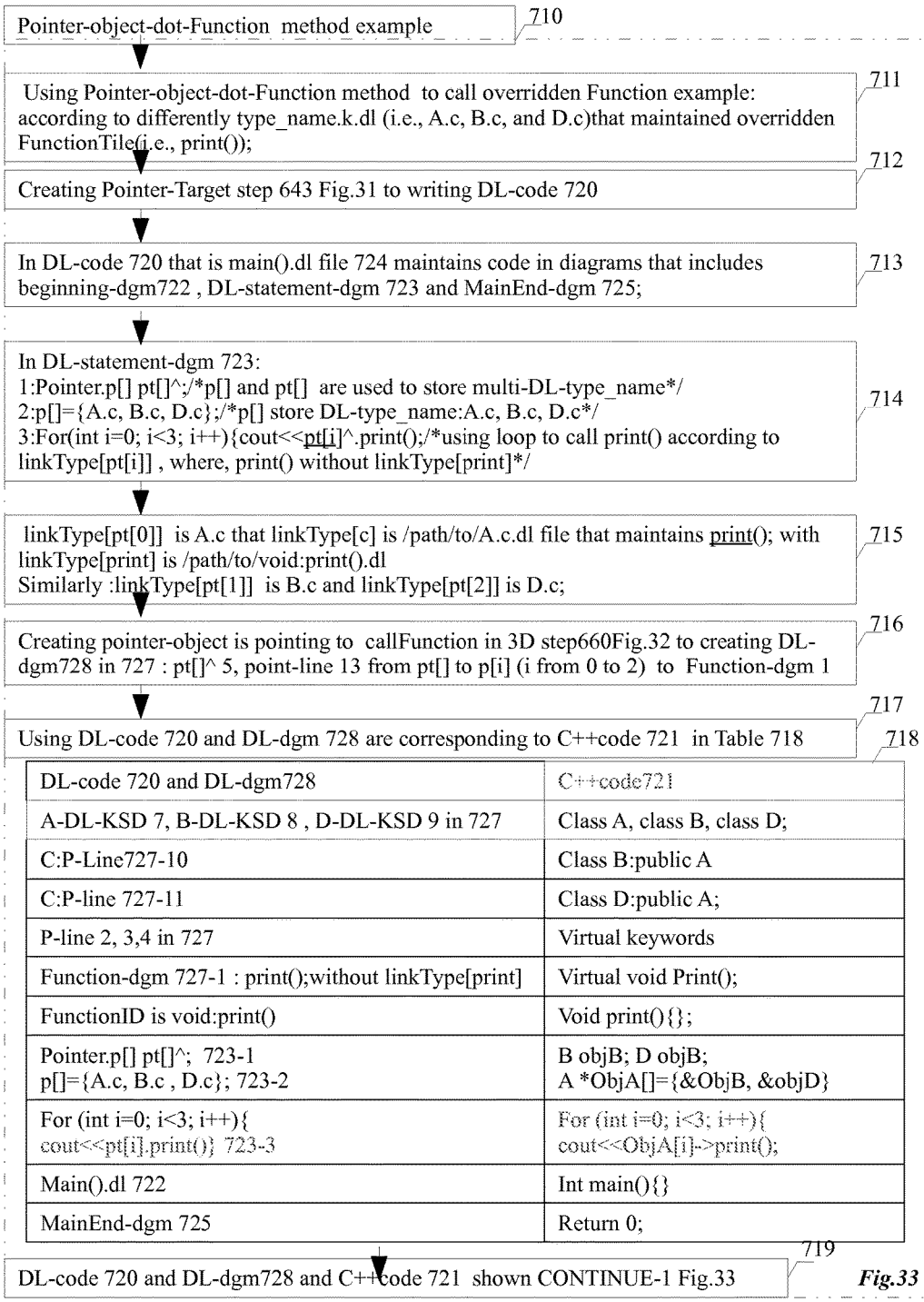

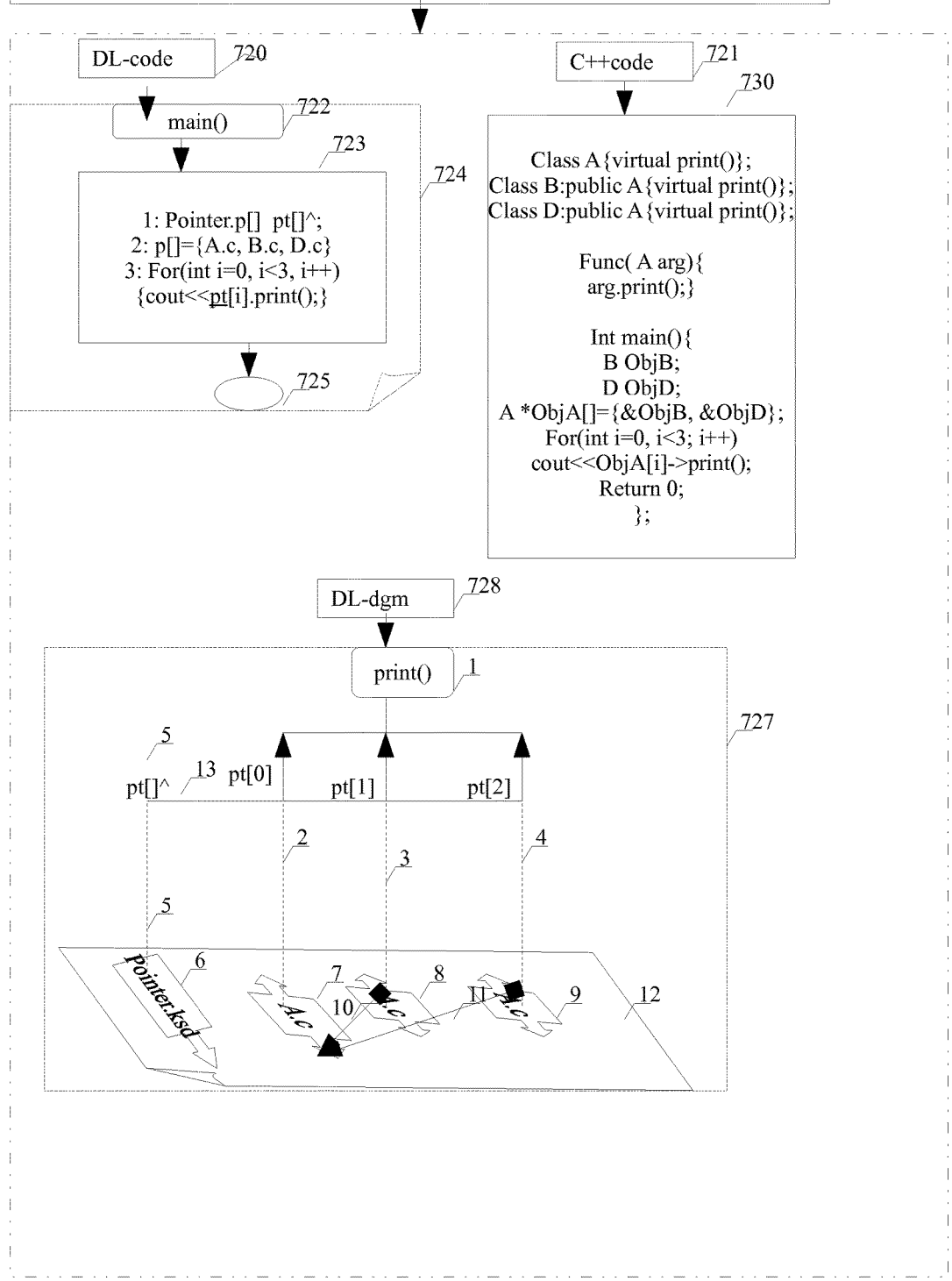

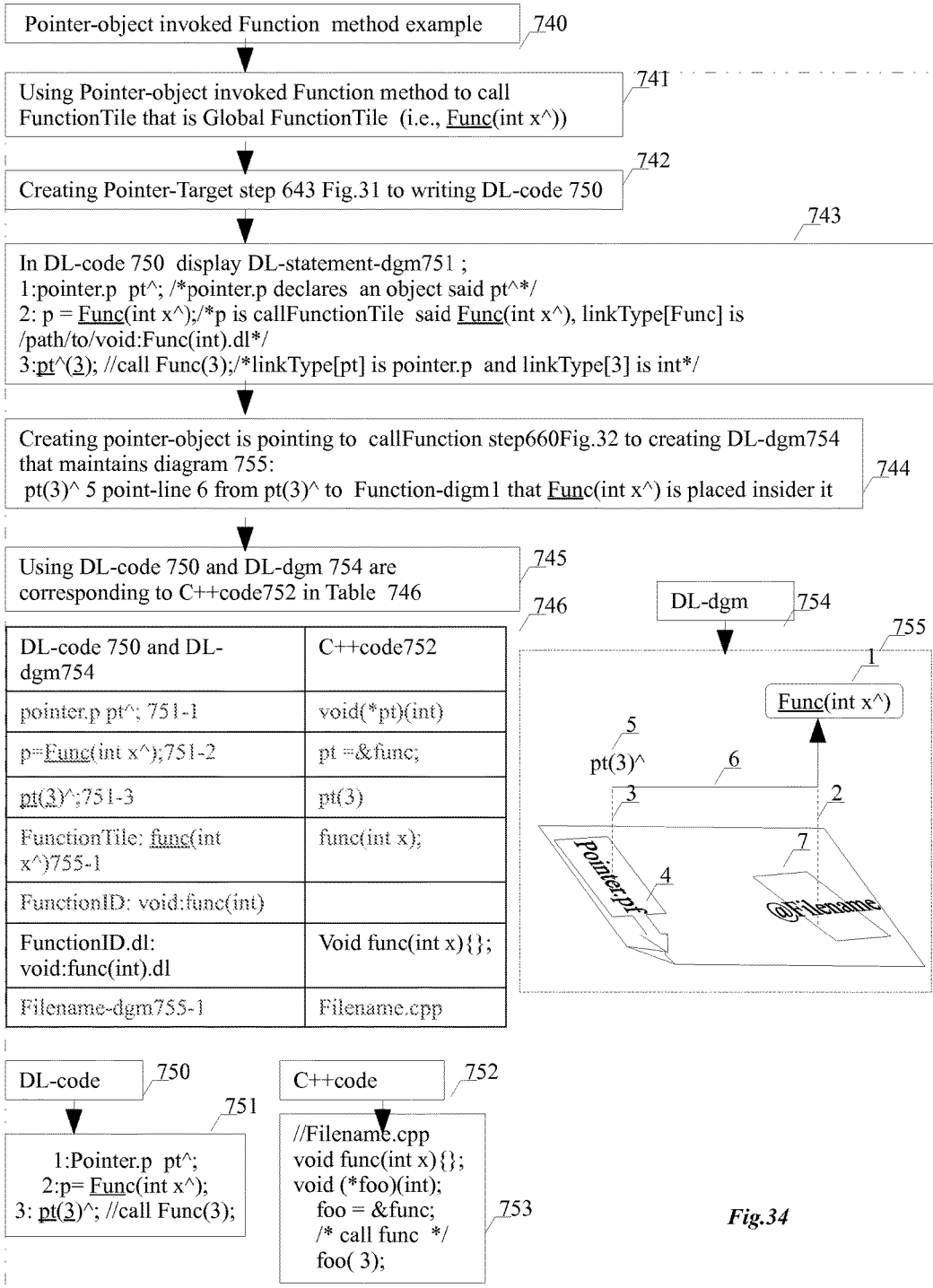

DIAGRAM LANGUAGE FOR COMPUTER PROGRAMMING

FIELD OF THE INVENTION

The present invention relates computer programming language that is appropriate for High Level Language and translator which converts one High-Level Language to another High-Level Language.

BACKGROUND

For many years, there has been a continuous evolution in graphs are used as models in differently areas of software. The evolution can be described as one of object model, configuration framework, describing software components and connected together on general purpose processors.

The Traditional diagrams are intended to model both computational and organizational processes such as Unified Modeling Language, however, only simply diagrams can be directly used to convert High-Level-Language (HLL) such as simple cases; The meaning of the model is not representations of Keyword Structure Definition (i.e., class structure definition: class type_name { };, where, class is keyword) or complexity Function Definition Structure; therefore, It is hard that typically analyzed to find out properties of the modelled subject, or transformation to constructor other types of models;

To aspect graphs that can be used for analysis, inspection, text-to-model, model-to-text and model-to-model on a general High-Level-Language;

SUMMARY OF THE INVENTION

To advance graph analysis, inspection and transformation techniques on a general level. Thus the present invention addresses or solves the above and/or other problem in the computer language in art methods as following:
1. Preferred according to the present inventions Diagram Language For computer language; Diagrams are based on the model representations of Keyword Structure Definition said KSD and Function Structure Definition said FSD (i.e., void Func( ){ };etc) to development a new High-Level Language of computer programming said Diagram Language (DL); The Diagrams are not only as an activity diagrams that are intended to model both computational and organizational processes and also as a Structure Definition Diagrams that are representations of structures definition with their relationship information to diagram parallel and distribution formation so as to achieve text-to-diagram, diagram-to-diagram and diagram-to-text transformation;
1.1) Structure Definition Diagrams (SDD) are constructor from a limited models, connected diagrams with relationship line that representation behavior of a method;
A) SDD are maintained in unique and independence file to avoid matching and isomorphism; which mean that they are independence with another files of SDD in the database said DL-database that association with writing DL-code in diagram and text; it is advantages that flexible to building model as a diagram that is representing to an SDD and it is advantages that establishment diagrams in parallel and distributed that are representing to relationship between SDDs; Therefor, it is help for programer designing and analysis and also for developer test, simulation and bug mitigation in processing;
B) each SDD is maintained in the models as a diagram that instead of Keyword Language (i.e., C++ class, struct etc); it is advantage that using diagrams as keywords that compile programing understanding are used to general purpose programming; in other words, DL and any other HLL can be converted between them. Which mean that the DL can be used to third-party development as part of a software development software. If the applications are written in different languages which will transfer to DL that allow for data analysis and reporting can transfer to another languages which will be used in the service operation system.
C) DL is a differently with other diagrams such as UML, DL can convert to diagram-to-text and text-to-diagram revers; It is advantages that text is exploited in diagram with 3D that more clearly and understand designing, test, simulation, inspection and bug mitigation for programming. using model as a diagram to reduce statement in text in DL, Therefore it is eliminating complex language statements such as C++ and also reducing processing time of compile programming.
1.2) Definition of DL that are used in Language:
  LinkType[ ] definition: In DL, it has specifically character that utilizes linking properties to represent Name that indicates specify information or linking through a path to a file that maintains information will be provided to compile programming; and it is advantages that linkType[ ] is solution communication problems between files, diagrams and file to diagram because each file or diagram is uniquely and independently maintained in DL-database; a Name with underline or without underline can be linked with linking which is linking to a name or file said LinkType[name]; For example: (a) Name with underline: name: linkType[name] is /path/to/afile.dl or linkType[name] is a Name; (b) a Name without underline such as type_name.k, where, extension .k has a linking said linkType[k] is /path/to/afile.dl;
  afile.dl definition: a file maintains diagrams that DL-statements are placed insider it said file.dl, where extension.dl is indication DL;
  DL-type definition: it is similarly with C++ that include data-type and user-defined-type; however, In DL, the user-defined-type with extension .k which mean that user-defined-type .k said type_name.k or said DL-type_name; where, extension .k has a linkType[k] that is /path/to/type_name.k.dl file; and also In DL, it has specify DL-type said Pointer-type that is user define type which declares an object said Pointer-object that is used to point call Function; The Pointer-object in DL is corresponding to C++ virtual, Pointer Function characteristics; It is advantages that reduce writing complexity statements that include pointer and assignment address in C++;
  DL-object definition: an object with Id and linkType [object] that is DL-type said DL-object; The Identity and linkType[object] are provided to DL-object that has freely going to anywhere; in other words, the compile programming can realize object even though the DL-object is declared and used in the file separately in DL-database; and the DL-object still can stochastic processes including random walks;
  symbol @ definition: is representing a GlobalList.dl; to disquisition with another diagram and indicate the GlobalList.dl belong to which diagram, setting symbol "@" has linkType[@] is /path/to/GlobalList.dl file and the symbol "@" will be placed insider a diagram that GlobalList is belonged;

symbol ⓜ definition: is representing a Main.dl; setting symbol "ⓜ" has linkType[ⓜ] is /path/to/Main.dl file and the symbol "ⓜ" will be placed insider a diagram said Filename-diagram;

Filename definition: a fold contains files of DL-programming of project; the user define a name said Filename; in other words, the Filename maintains data said DL-database; using a model as a diagram said Filename-diagram that Filename is placed insider it to representation Filename in diagram that is used to emerge in Emerge.r.dl file; DL-database is provided data and diagrams information for writing DL-code, drawn DL-diagram and compile programming processing;

type_name.k.dl file: maintains Keyword Structure Definition (i.e., C++ class type_name{ };) in diagrams; and using the type_name.k to be identity of type_name.k.dl file; where, extension .k has a link said linkType[k] is /path/to/type_name.k.dl that provides compile programming ignore the keyword meaning and just directly log into file according to linkType[k] in the DL;

In other words, once their structure definition is converted to Diagram in DL, the compile programming only recognize the file according to linkType[k]; Therefor, keyword mean in DL is lose its definition meaning; in other words, the DL is not only corresponding to C++ and also to another High-Level-Language such as java;

DL-KSD: using components models as a diagram that type_name.k is placed insider it said DL-KSD; it is representation type_name.k.dl file in diagram that is used to emerge in the Emerge.r.dl file;

Emerge.r.dl file definition: emerging diagrams with their relationship line (Re-line) are maintained in a file said Emerge.r.dl; and also text converts to models as diagrams that are maintained in Emerge.r.dl file; The emerge.r.dl not only is providing to compile programming for checking whether writing DL-code correct or not and also is provided to programmer writing DL-code and test, simulation, bug mitigation in development;

The Re-line indicates that diagrams parallel and distributed and diagram distance and diagram-based relationship (i.e., C++ derived: base class) in emerge.r.dl file; The use of Emerge.r.dl file to help analysis, such as verification, testing, static analysis, and simulation in software;

FunctionID definition: a unique identity of Function structure definition said FunctionID in DL-database; The FunctionID maintains Function structure definition in standard models as a diagram to create FunctionID.dl file which use limit Diagrams to reduce complex structures in DL; and it is convenience for compile programming processing function according to standard diagrams;

FunctionTile definition: FunctionTile is Function Interface in DL; it is not only maintained in the FunctionID.dl file and also corresponding to file (i.e., type_name.k.dl file); each FunctionTile has a linkType[Function-Identity] said linkType[FId] which is linking to a file according to FunctionTile location;

FunctionTile is provided to compile programing to call Function according linkType[FId] when the call function has linkType[FId] exist; otherwise, according to DL-object which provides linkType[object] information to search call Function.

2. According to the First present invention, aspect this Two inventions is DL-database said Filename fold contains, comprising: Filename fold that includes two database: <1> Main.dl file, GlobalList.dl file and Function fold that contains Global FunctionID.dl file; <2> type_name.k fold that contains type_name.k.dl, GlobalList.dl and Function fold that contains Member FunctionID.dl file; DL-Global statement are maintained in GlobalList file said GlobalList.dl; DL-Global Function Definition is maintained in Filename/Function/FunctionID.dl file; and DL-Main Function-definition is maintained in /Filename/Main.dl; The Keyword Structure Definition (i.e., C++ class type_name {body}; keyword is class) is maintained in diagrams that type_name and body is placed insider it in a file said type_name.k.dl which stores path/to/type_name.k/type_name.k.dl in DL-database;

If the Filename fold contains more than one type_name.k folds which indicates that the DL-KSDs is established diagrams in parallel architectures in emerge.r.dl file; and the Re-line between them is one of C:P-line, P:B-line and Include-line (In-line);

If the type_name.k fold contains at least another type_name.k fold which indicates that the DL-KSD with another-DL-KSD is established diagrams in distribution architectures in emerge.r.dl file; and the Re-line between them is Nest-line;

Function fold contains unique FunctionID.dl file; overridden Functions are maintained in differently Function fold.

3. According to the First and Second present invention, aspect this Three inventions is Definition DL-type_name, type_name.k.dl, DL-KSD and Identity:

DL-type_name is type_name.k; where, k has a linkType [k] is /path/to/type_name.k.dl; if programmer wants to convert DL to another HLL, then setting k is keyword Structure Definition; For example that converting DL to C++: C++ class type_name {body}; is corresponding to DL: type_name.c and linkType[c] is /path/to/type_name.c.dl file that maintains diagrams that body of type_name are placed insider them; There are two special DL-type_name according to special case of Keyword Structure Definition:

a) if Keyword Structure Definition without type_name and with an object, setting ♂ symbol with object to instead of DL-type_name in DL; in other words, type_name.k is ♂object.k;

b) if Keyword Structure Definition without type_name and object, setting double ♂♂ symbol to be type_name; in other words, type_name.k is ♂♂.k;

Type_name.k.dl file maintains diagrams includes DL-type_name-diagram (said DL-type_name-dgm), member-dgm and DL-ObjectList-dgm, comprising:

a) a left, right, up, down arrows callout models as a diagram that DL-type_name is placed insider it, this diagram is called DL-type_name-diagram;

b) member-dgm includes Public-dgm, Private-dgm and Protected-dgm, comprising:

a Rectangle model on the right of DL-type_name-dgm as a diagram that members of public are placed insider it said Public-dgm;

a Rectangle model on the left of DL-type_name-dgm as a diagram that members of private are placed insider it said Private-dgm;

a Rectangle model on the down of DL-type_name-dgm as a diagram that members of protected are placed insider it said Protected-dgm c) if you want to maintain an object that is declared with its type_name.k in type_name.k.dl; A Rectangle model on the up of DL-type_name-dgm as a diagram that DL-object is placed insider it said DL-ObjectList-dgm;

DL-KSD: a left, right arrow callout models as a diagram that DL-type_name is placed insider it said DL-KSD which is representing to type_name.k.dl file in Emerge.r.dl file;

Identity definition: an object is declared with its DL-type at a location which is said Identity;

if DL-type object statement located in the GlobalList.dl file, then the Identity is g, writing ^g; where g has linkType[g] that is /path/to/GlobalList.dl if DL-type object statement located in FunctionTile or FunctionID.dl, then the Identity is 1, writing ^l; where l no linkType[l] exist, so that just write ^;

if DL-type object statement located in type_name.k.dl file, then the Identity is k, writing ^k; where k has linkType[k] that is /path/to/type_name.k.dl file;

In DL, making full use of diagrams to represent keywords that are correspond to C++ such as public, private and protected; It is advantages that achieve model to text transformation in writing DL-code or compile programming processing. the compile programming only recognize the file from linkType[ ]; in other words, the diagrams in DL instead of special Keyword of another HLL; Therefore, The DL not only is corresponding to C++ and also to another HLL;

4. According to the First and Third present invention, aspect this Four inventions is DL-type and DL-type[object]: a DL-type declaration Object statement is called DL-type [object] in DL and DL-type [object] syntax: DL-type object^Id;

DL-type include DL-type_name and Data-type which is similarly with C++;

writing DL-type[object], First according to Identity definition to obtain Id of object; then if DL-type is data-type, DL-type[object] is "data-type object^id;"

if DL-type is DL-type_name, copying DL-type_name from DL-KSD in Emerge.r.dl file DL-type[object] is "type_name.k object^id;"

where, using copying DL-type_name from DL-KSD that linkType[k] also is copied; otherwise, if you write DL-type_name that is type_name.k, you have to setting linkType[k] that is /path/to/type_name.k.dl file; DL-type[object] is providing information about where object is generated and who is declaratory, if declaratory is type_name, then you can know about its type_name.k.dl file information from the linkType[k];

In DL, Emerge.r.dl is providing DL-KSD information to programmer and compile programming that type_name.k.dl file is linked without searching "#include file" like C++; and also It is more easy to help developer synthesis, planning, bug mitigation and repair DL-code.

5. According to the Four present invention, aspect this Five inventions is DL-object and writing DL-object step:

an object with Identity and linkType[ ] said DL-object which syntax: object^Id;

writing DL-object step after the DL-type[object] exist:

copy object^id from DL-type[object];

setting underline of object: object^Id;

setting underline has a link said linkType[object] that is DL-type;

In DL, an Object with linkType[ ] and Id to be freely object, which mean that no matter where it is used, the compile programming still can recognize object from where and who is declaratory; the compile programming just use linkType[object] information to judge what it is next processing; which mean that it is reducing search object information processing for compile programming that compare with C++; It is more easy way to help developer understand statement, bug mitigation and repair DL-code.

6. According to the first present invention, aspect this Six inventions is that @ is representing GlobalList.dl file and Ⓜ is representing to Main.dl file; Sometime the DL-statement may write in GlobalList.dl which will be used in the DL-code, to avoid to search GlobalList processing, we design a @ symbol which has linkType[@] that is /path/to/GlobalList.dl;

if/path/to/Filename/GlobalList.dl in DL-database, then adding @ in the Filename-dgm in Emerge.r.dl file;

if/path/to/type_name.k/GlobalList.dl in DL-database, then adding @ in DL-KSD in Emerge.r.dl file.

From the diagram of @ located, to know that the GlobalList is belonged to Filename or DL-KSD; The symbol Ⓜ which has linkType[Ⓜ] that is /path/to/Main.dl; and adding Ⓜ in Filename-dgm in Emerge.r.dl; it is more easy way to help developer understand file information at grace; the linkType[@] help to writing DL-statement without searching processing and also it is help developer to know GlobalList.dl information without searching processing; It is reducing compile programming processing that going to database to search GlobalList for identify statement.

7. According to the First present invention, aspect this Seven inventions is Definition Relationship-Line (said Re-line) includes:

C:P-Line: A Child-DL-KSD is a type_name.k.dl whose retains characteristics of a Parent-DL-KSD. Child-DL-KSD inherits which members of the Parent-DL-KSD according to C:P-Line which points to member-dgm; using a line with squire/arrow model as a diagram said Child:Parent-line (C:P-line): the squire attached to the middle of Child-DL-KSD and arrow is attached to member-dgm of Parent-DL-KSD;

if the member-dgm is Public-dgm, which mean that the Child-DL-KSD access into public member; corresponding to C++ statement: class Child: public Parent { };

if the member-dgm is private-dgm, which mean that the Child-DL-KSD access into private member; corresponding to C++ statement: class Child: private Parent{ };

if the member-dgm is Protected-dgm, which mean that the Child-DL-KSD access into protected member; corresponding to C++ statement: class Child: protected Parent{ };

P:B-line: a Permit-DL-KSD is a type_name.k.dl whose has permitted from its Boss-DL-KSD to access into private or protected member-dgm of its Boss-DL-KSD; connection Three lines as a diagram said P:B-line; the one of three line is attached to the middle of the Permit-DL-KSD and two lines are attached to private-dgm and to Protected-dgm of Boss-DL-KSD separately; corresponding to C++ statement: class Boss{Friend Permit;};

Nest-Line: a nest-DL-KSD is a type_name.k.dl whose is as a member of DL-KSD; using a line with circle/arrow model as a diagram said Nest-line: the circle attached to the middle of nest-DL-KSD and arrow is attached to member-dgm of DL-KSD;

if the member-dgm is Public-dgm, which mean that the nest-DL-KSD is a member of public of DL-KSD; corresponding to C++ statement: class type_name {public: class nest{ };};

if the member-dgm is private-dgm, which mean that the nest-DL-KSD is a member of private of DL-KSD; corresponding to C++ statement: class type_name{private: class nest{ };};

if the member-dgm is Protected-dgm, which mean that the nest-DL-KSD is a member of protected of DL-KSD; corresponding to C++ statement: class type_name {protected: class nest{ };};

In-Line (or Include-Line): An object is declared with its DL-type_name in a file; which mean the file includes DL-KSD; using a line end arrow model as a diagram from the middle of file-dgm to the middle of DL-KSD;

if file is type_name.k.dl, then file-dgm is DL-KSD; corresponding to C++ statement: //.h file: #include "type_name.h";

if file is Filename, then file-dgm is Filename-dgm; corresponding to C++ statement: //Filename.cpp: #include "type_name.h";

P-line: creating a dash-line as a diagram that Perpendicular to File-dgm said P-line and Target on the top of P-Line; which mean that the Target is from File-dgm;

C-line: a dash line as a diagram that connection two Targets of P-line said C-line;

Pointer-line: an end line with arrow as a diagram that from Target to another Target said Pointer-line; which mean that the end line attached to Target said Pointer and arrow is attached to Target said Pointing-Target 8. According to the Three, Six and Seven present invention, aspect this Eight present inventions maintaining Emerge.r.dl file: (1) copy each DL-KSD from type_name.k.dl file to Emerge.r.dl and according design and analysis program to set up Relationship-line between DL-KSDs in Emerge.r.dl; (2) To disquisition DL-KSD and Filename-dgm in the diagram, setting Rectangle model as a diagram that Filename is placed insider it said Filename-dgm; if GlobalList.dl exist, then setting @ with its linkType[@] adds to Filename-dgm and also setting Ⓜwith linkType[Ⓜ] adds to Filename-dgm; (3) To display FunctionTile in Emerge.r.dl file in diagram, setting Rectangle, Roundel model as a diagram that FunctionTile is placed insider it said Function-dgm; using Function-dgm depends on the call Function statement in text that is exploited with 3D in Emerge.r.dl;

The Emerge.r.dl file emerges each independence DL-KSD with Relationship-line parallel and distribution architectural in DL-database;

The Emerge.r.dl provides DL-type_name of DL-KSD that is used in the DL-code and also the Relationship-line is providing to compile programming to check whether writing DL-code according to design;

The Emerge.r.dl provides text-to-diagram in 3D that exploits text in diagrams with 3D;

creating Filename-dgm with Relationship-line in Emerge.r.dl according to design;

The Emerge.r.dl provides diagram to diagram, diagram to text and text to diagram information to help developer test, debugger, bug mitigation and repair;

9. According to the Four and Eight present invention, aspect this Nine present inventions displaying Constructor and Destructor with 3D in the Emerge.r.dl: in invention Four, once writing DL-type[object] and DL-type is DL-type_name, then the constructor or destructor is displayed with 3D in the emerge.r.dl if they exist in type_name.k.dl file; To help the developer knows call constructor or destructor information from Emerge.r.dl at grace.

once writing DL-type[object]: type object^Id; and the type is DL-type_name (said type_name.k), generation a P-line of the DL-KSD that type_name.k is placed insider it on the Emerge.r.dl and Target that is object^id which is on the top of P-line said Object-Target; To check whether constructor or destructor exist in the DL-KSD to process Does Display List Is Exist in innovation Eleven; if return True, then DisplayList that maintains constructor and destructor information, if it is constructor, then adding symbol + with linkType[+] that is /path/to/constructor.dl file with object-Target in Emerge.r.dl file, otherwise, if it is destructor, then add symbol ~ with linkType[~] that is /path/to/constructor.dl file with object-Target in Emerge.r.dl file;

If return False, going to processing Displaying Cons-Destructor of Parent-DL-KSD with 3D in the Emerge.r.dl in Twelve inventions to check whether constructor or Destructor exist in the Parent-DL-KSD; if yes, then constructor or Destructor of Parent-DL-KSD also display in the Emerge.r.dl file;

10. According to the Nine and Seven present invention, aspect this Ten present inventions Displaying Cons-Destructor of Parent-DL-KSD with 3D in the Emerge.r.dl: First, processing Does Parent List Is Exist programing in innovation Twelve to check return value, if return value is True, then getting ParentList that maintains Parent-DL-type_name; according to ParentList, to obtain linkType[k] of Parent-DL-type_name that is /path/to/Parent-type_name.k.dl file and to check whether constructor or destructor exist in Parent-type_name.k.dl file, processing Does Display List Is Exist in innovation Eleven to obtain return value, if true, then obtaining DisplayList that maintains constructor and destructor information; similarly with Child-DL-KSD in innovation present Nine, the P-line of Parent-DL-KSD is created with Target that is symbol + or ~ on the top of P-line said Symbol-Target; and using C-line connects between object-Target and symbol-Target to indicate calling constructor or destructor information when an object is declared with its DL-type_name;

The object and +~ symbol with 3D displays in the Emerge.r.dl processing according to DL-code, in other words, this is text-to-diagram processing in DL; using 3D to disquisition with DL-KSD relationship-line information and more clearly to help developer test, debugger, bug mitigation and repair;

11. According to the Nine and Ten present invention, aspect this Eleven present inventions Does Display List Is Exist: getting linkType[k] from DL-KSD in emerge.r.dl file that is /path/to/type_name.k.dl file and checking whether the constructor or destructor exist in the type_name.k.dl file, if yes, copy them into DisplayList; and return True, otherwise, return False;

12. According to the Ten present invention, aspect this Twelve present inventions Does Parent List Is Exist: To check whether Parent-DL-KSD exist, then processing Does DL-type_name With Re-line to obtain Re-line-list that maintains C:P-line; going to Check whether C:P-line with Child-DL-KSD exist, if yes, then according to C:P-line, searching Parent-DL-KSD to obtain Parent-DL-type_name that is maintained in the ParentList; and return True, otherwise, return False;

From this case, it is verify that DL can utilizes diagram to diagram information to obtain information for processing; which mean that it is help to reduce writing statements in the text and help designer more easy simply to write a satisfy code without professor skill in DL;

13. According to the Twelve present invention, aspect this Thirteen present inventions Does DL-type_name With Re-line: checking whether the Re-line with DL-KSD, getting Re-line that is attached with DL-KSD, according to Re-line character to obtain the Re-line name from Diagram Name List; maintaining Re-line Name in the Re-line-List, and return True, otherwise, return False.

14. According to the First present invention, aspect this Fourteen present inventions Definition FunctionID and FunctionTile in DL: according to FunctionID definition, it is unique Identity in the Function Fold, so that, it is used to be file name said FunctionID.dl file that maintains diagrams according to Standard Begin and End of Function-dgm; according to FunctionTile definition to obtain FunctionTile, however, setting linkType[FId] according to FunctionTile location: FunctionTile is maintained in the FunctionID.dl file and GlobalList.dl or type_name.k.dl file separately according to Function character;

A) Function character is Global:
  FunctionTile is maintained in the GlobalList.dl file and setting linkType[FId] of FunctionTile is /path/to/FunctionID.dl file;
  FunctionTile is maintained in the Beginning-dgm of FunctionID.dl file and setting linkType[FId] of FunctionTile is /path/to/GlobalList.dl;

B) Function character is Member of type_name.k:
  FunctionTile is maintained in the member-dgm of type_name.k.dl file and setting linkType[FId] of FunctionTile is /path/to/FunctionID.dl file;
  FunctionTile is maintained in Beginning-dgm of FunctionID.dl file and setting linkType[FId] of FunctionTile is /path/to/type_name.k.dl file In DL, using linkType[FId] of FunctionTile solution problem that FunctionID.dl and FunctionTile separately in differently location in DL-database and also it makes more easy way to call Function without to trace address or search files for compile programming and also it is convenience to help developer test, bug mitigate, and repair programming.

15. According to the Fourteen present invention, aspect this Fifteen present inventions Standard Begin and End of Function-dgm:
  In FunctionID.dl, using a Rectangle, Rounded model as a diagram that FunctionTile is placed insider said beginning-dgm; Then using a Rectangle model as a diagram that body of DL-statement is placed insider said DL-statement-dgm; Final diagram according to return value:
    if return value exist; then using a left arrow model as a diagram that return value is placed insider said return-dgm
    if no return value exist, then using a Trapezoid model as a diagram that End is placed insider said End-dgm
  To disquisition Function End and Main End diagram, using an Ellipse model as a diagram that End is placed insider it said MainEnd-dgm;
  using beginning-dgm and End-dgm to disquisition DL-statement-dgm, so that compile programming to know Function interface diagram and End Function diagram according to Function-diagrams;

16. According to the Six and Fourteen present invention, aspect this Sixteen present inventions writing call Function step: call Function syntax: <u>FId(object^Id)</u>; where, FId with linkType[FId] that is /path/to/FunctionID.dl and parameter is DL-object[input value]; To determinate call Function, copy FId with linkType[FId] from GlobalList.dl if call Function is Global Function or Type_name.k.dl if call Function is Member Function;

Global Function:
  search @ with Filename or DL-type_name in Emerge.r.dl which you know that the FunctionTile is maintained in the GlobalList.dl, because linkType[@] is /path/to/GlobalList.dl file;
  copying FId with linkType[FId] from FunctionTile that is maintained in GlobalList.dl file to DL-statement in FunctionID.dl file;

Member Function:
  search DL-type_name in Emerge.r.dl which you know that the FunctionTile is maintained in the type_name.k.dl file, because linkType[k] of DL-type_name is /path/to/type_name.k.dl file;
  copying FId with linkType[FId] from FunctionTile that is maintained in type_name.k.dl file to DL-statement in FunctionID.dl file;
  update DL-type[arg] of FunctionTile to DL-object[input-value]:

Similarly C++, the call Function need to update its input-value in parameter list of call Function in DL; copying input-value from DL-type[input-value] is to be DL-object[input-value] that is parameter-DL-object of call Function; The compile programming similarly with C++, to check whether DL-type of input-value from DL-type[input-value] and DL-type of argument from DL-type[arg] of FunctionTile is equality, if not, sent out Error message;

It is advantage that the compile programming do not need to search address of Function or object which access into call Function such as C++; in other words, it is reduce assignment address statement for compile program in the DL; the object obtain value from call Function statement according to linkType[FId], not type of object; of course, the compile programming still need to check whether DL-type of object and DL-type of call Function is equality, if not, the compile programming will sent out Error message. It is verify that using diagram-to-text and text-to-diagram processing exist in the DL;

17. According to the Six and Seven present invention, aspect this seventeen present inventions Global Function using P:B-Line example: This example is corresponding to C++ Friend Function that the object in Global Function can access into private member of DL-KSD;

In DL, utilizing P:B-Line indicates that the Function is permit by the Boss-DL-KSD; then the object of Function can access into private or protected member of Boss-DL-KSD;
  example: an DL-type[arg]List of FunctionTile (i.e, GFId (A.c a^; )) of GlobalFunction has DL-type_name (i.e., A.c) exist, and this DL-type_name declares an object (i.e., A.c a^; ) that access into private or protected member-dgm (i.e., int pm^; c) in type_name.k.dl file; For this reason, the GlobalFunction needs to obtain permit from the DL-type_name in Emerge.r.dl file;

To drawn Function and DL-KSD with P:B-line step:
  search file-dgm that includes @ and its linkType[@] is /path/to/ GlobalList.dl and copying FunctionTile from GlobalList.dl;
  creating P-line that is Perpendicular to file-dgm;
  To disquisition Target is Function or object; creating a Rectangle, Roundel model as a diagram that FunctionTile is placed insider it;
  Function obtains Permission from Boss-DL-KSD (i.e., A-DL-KSD), so that according to P:B-line definition to drawn Function-dgm to A-DL-KSD that the two line are attached to private and protected member-dgm of A-DL-KSD in 3D;

To write DL-code in FunctionID.dl file

FunctionTile: GFId(A.c a^; ); /*linkType[GFId] is /path/to/GlobalList.dl*/

DL-statement-dgm: a^.pm^c; /*where, linkType[a] is A.c and linkType[c] of A.c is /path/to/type_name.k.dl; linkType[pm] is int and linkType[c] of pm is /path/to/A.c.dl*/

To compile programming: checking whether linkType[c] from linkType[a] and linkType[c] from pm is equality, if yes, then going to Emerge.r.dl to check whether P:B-line exist and if yes, checking whether indicates that the GFId obtain permit from the A-DL-KSD that A.c is placed insider it; if yes, then DL-statement is correct which mean that the "a^" object has right obtain pm value; otherwise sent out Error Message;

This example is corresponding to C++ statement: class A{private: int pm; public: Friend GFId(A);}; GFId(A a){a.pm}; In DL, using P:B-line to instead of C++ Friend keyword includes both Friend Class and Friend Function; which mean that using diagram to instead of keywords to reduce complex statement in text; and also it is verifying that the text-to-diagram and diagram-to-text exist in the DL;

18. According to the First and Eight and Seven present invention, aspect this Eighteen present inventions About Pointer-type Information:

a) Pointer-type definition: A name with extension .p is used to user-defined-type that declaration an object; this name.p said Pointer-type which has type_name character without maintaining type_name.k.dl file; Pointer-type[object] syntax: type_name.p object^Id; where, object said Pointer-object that is used to invoke call Function;

b) Pointer-object call Function method:

Pointer-object-dot-Function method syntax: Pointer-object.callFunctionTile; where, call FunctionTile without linkType[FId];

Pointer-object invoke call Function method syntax: Pointer-object;

c) Creating Pointer-Target step: Pointer-type[object]: pointer-type_name.p object^Id; chose pointer-object call Function method;

<1> if chose pointer-object invoke call Function method, then, copying FunctionTile from type_name.k.dl file or GlobalList.dl file; and setting p=FunctionTile with linkType[FId] that is /path/to/FunctionID.dl; then, Pointer-object invokes call Function method: object^Id; where, linkType[object] is pointer-type_name.p and p is FunctionTile with linkType[FId]; the compile programming process FunctionID.dl file according to linkType[FId];

<2> if chose pointer-dot-Function method: then copy DL-type_name from DL-KSD that maintains call FunctionTile; and setting p=DL-type_name; and object^Id.FunctionTile; where, FunctionTile without linkType[FId]; compile programming use linkType[object] that is pointer-type_name.p and p is type_name.k with linkType[k] that is type_name.k.dl file and searching FunctionTile of call Function and FunctionTile from type_name.k.dl is equality; and from matching FunctionTile to obtain linkType[FId] that is /path/to/FunctionID.dl which is processed by compile programming;

d) Pointer-dgm: To exploit Pointer-object and Pointer-Function in 3D in the Emerge.r.dl; we design Pointer-dgm; because the Pointer-type_name is differently with DL-KSD, then using a right arrow callout model as a diagram that Pointer-type_name is placed insider it said Pointer-dgm in DL; The Pointer-dgm is only maintained in the Emerge.r.dl file;

e) Creating pointer-object is pointing to call Function in 3D step:

<1> Creating a Pointer-dgm in emerge.r.dl and creating two P-lines; one is perpendicular to Pointer-dgm; and Target is Pointer-object; which mean that generated a pointer-object from pointer-type_name that is placed insider Pointer-dgm; <2> another one is perpendicular to file-dgm (DL-KSD or @filename-dgm) and Target is Function-dgm; which mean that call Function is maintained in the file that is placed insider file-dgm; <3> creating Pointer-line from Pointer-object to Function-dgm; which mean that the pointer-object is pointing to call Function;

The Pointer to call Function statement is converted to diagrams with 3D in Emerge.r.dl, it is verify that the text-to-diagram exist in DL. And Pointer-type is corresponding to C++ virtual keyword and Pointer Function statement.

BRIEF DESCRIPTION OF THE DRAWINGS

FIG. 2: illustrating a Diagram that description DL-database;

FIG. 3: illustrating a Table that description Determination DL-type_name;

FIG. 4: illustrating a Table that definition Identity;

FIG. 29: illustrating a diagram that description Creating P-line, C-line and Function-dgm in emerge.r.dl;

FIG. 33: illustrating a diagram that description Pointer-object-dot-Function method example;

FIG. 34: illustrating a diagram that description Pointer-object invoked Function method example;

DETAILED DESCRIPTION OF THE INVENTION

Figure 1:
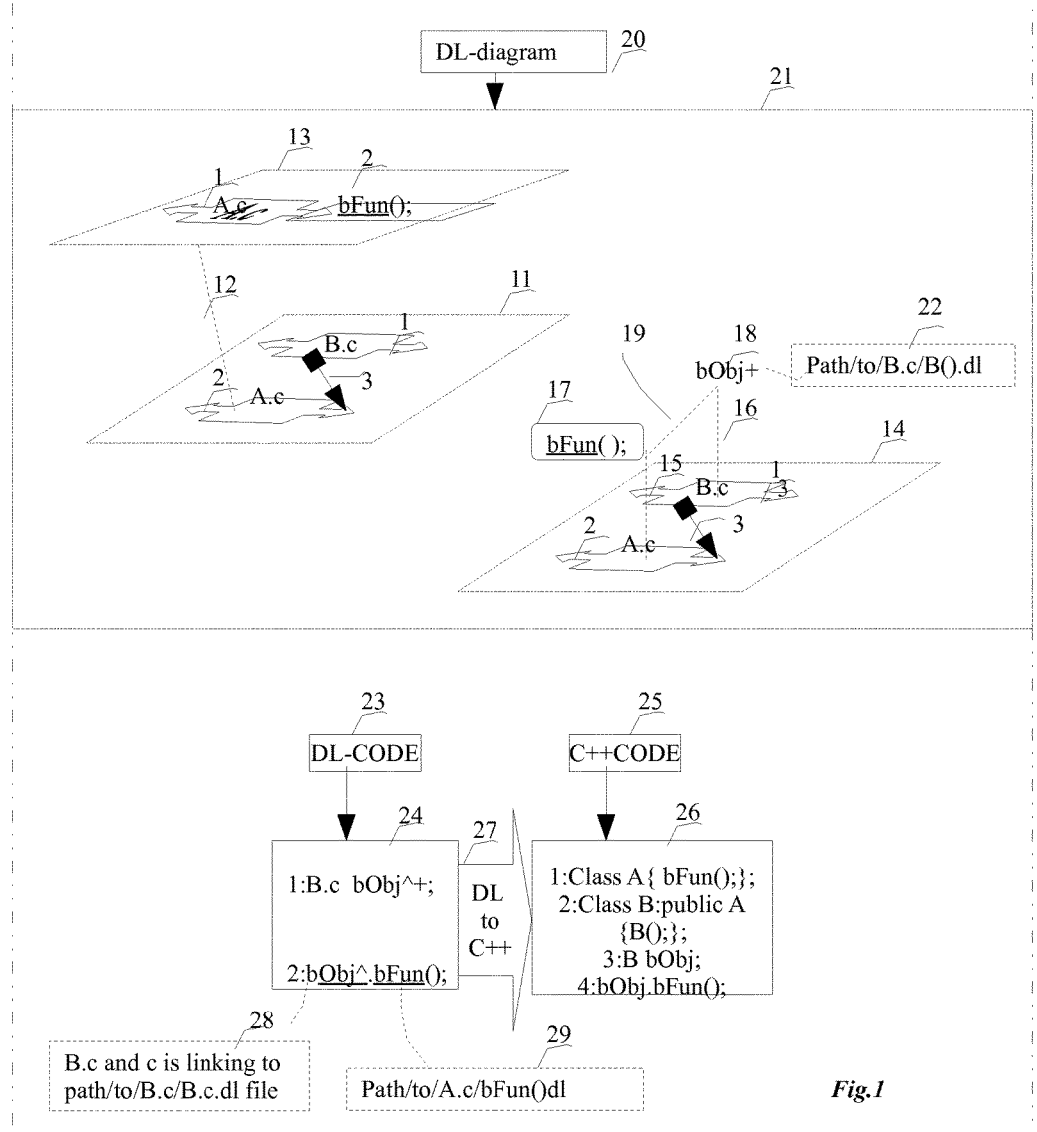
FIG. 1: An Example of Writing code with DL in 3D that is corresponding to C++ code.

FIG. 1: An Example of Writing code with DL in 3D that is corresponding to C++ code 10 in FIG. 1; using Diagram Language (DL) to write code and establishment model as a diagram said DL-diagram 20 in the file 21 to exploit diagram to diagram relationship and text to diagram transformation that is displayed in 3D on the file 14 in the example:

In DL, Before writing code, need to establish diagram 11 that maintains diagrams (11-1 and 11-2) and relationship line diagram (11-3) to represent class structure definition diagram that is corresponding to C++ code 25 in 26 file; where, DL-diagram 11-2 is corresponding to C++ code 26-1: class A{bFun( );}; DL-diagram 11-1 is corresponding to C++ code 26-2: class B:public A{B( );}; and relationship-line diagram 11-3 is corresponding to class B: public A relationship in 26-2;

In DL, the model as a diagram 11-1 and 11-2 that the A.c and B.c is placed insider it separately; the line diagram 11-3 that from diagram B.c to the diagram A.c, which indicates that the B.c is derived-class that can access into public member of A.c that is base-class; The extension .c has a link that is /path/to/file.dl which is maintains members in diagram; in example, click the .c of A.c to display diagram file 13 that diagram A.c 13-1 right arrow connects with a diagram 13-2 that public member are placed insider. (i.e. bFun( );); where, bFunc( ) has underline that is /path/to/bFunc( ).dl file (not shown) that maintains Function Structure Definition diagram which its statements are placed insider them; where, a dash line 12 is indication that the file 13 is from diagram A.c 11-2; once establishment DL-diagram 20, then going to write DL-code 23 in file 24: statement 24-1:B.c bObj^+; that is corresponding 27 to C++ code 25 in file 26: statement 3: B bObj; once writing DL-statement 24-1, a dash line 16 as a diagram perpendicular to diagram B.c 14-1 and bObj+ 18 on its top to describe DL-statement 24-1 in the diagram; it is to achieve text-to-diagram transformation in DL; note: the file 14 is copying from file 11 to describe text to diagram in 3D diagram more clearly; and DL-code 23 in file 24 statement 24-2: bObj^.bFun(); that is corresponding 27 to C++ code 25 in file 26 statement 4: bObj.bFun( ) once writing DL-statement 24-2, a dash line 15 as a diagram perpendicular to diagram A.c 14-2 and generated a diagram 17 that bFun( ) is placed insider it and between diagram 17 and bObj 18 has a dash line 19 that description DL-statement 24-2 in diagram with 3D; where, ^; mean that bObj is declared with its type said 14-2 A.c in local such as main function or function structure definition; and + is representing constructor (i.e., B( ); 26-2) and it has link that is /path/to/B.c/B( ).dl file 22 that maintains constructor structure definition in diagram that statements are placed insider them (not shown); where, DL-statement 24-2: underline of bObj is link to B.c and c is linking to path/to/B.c/B.c.dl file 28 that maintains class B structure definition in diagram (not shown) and underline of bFun is link to path/to/A.c/bFun( ).dl 29 that maintains bFun function structure definition in diagram (not shown);

note: a dash line with dash Rectangle models as a diagram that is used to explain information, they are not belonged to diagrams of DL;

From this example, to purpose diagram-to-diagram and diagram-to-text, text-to-diagram is successfully in DL; and DL allows that diagram and text can transfer to another languages such as C++, java; DL reduce keywords (i.e., C++ class, struct, union etc) in text and display DL-statement in 3D diagram to help developer more easy to design and analysis programming; The link in the DL is not only indicate that type or call function and also reduce compile programming search processing time;

FIG. 2: illustrating a Diagram that description DL-database 40 in FIG. 2; a file that is stored in the DL-database 40 has an extension ".dl" to indicate that writing text with Diagram Language (DL); The DL-database includes a fold 41 with a name said Filename fold that maintains all software information of programing, which contains comprising:

In database 43: 1:main( ).dl that maintains Main Structure Definition in diagram that DL-statements are placed insider them which is corresponding to C++ Main( ) function definition; 2: GlobalList.dl file that maintain DL-statement is in the global location which is corresponding to statement in Global location of Filename.cpp file of C++; 3: Emerge.r.dl file that maintains diagrams that are parallel and distribution with relationship-line to represent Keyword Structure Definition (KSD) relationship in diagrams and to help for writing DL-code; 4: Function fold contains Global Function Structure Definition (FSD) that converted to Diagram file said 4-1 FunctionID.dl file that is corresponding to C++ Global FSD with statements;

In database 42 contains comprising: 1:type_name.k is type in DL said DL-type which is corresponding to C++ user-define-type that is used to be a name of fold said type_name.k fold that maintains 1-1: type_name.k.dl file which maintains DL-KSD in diagram which are corresponding to C++ KSD (i.e., class type_name {body statement};) statements; 1-2: Function fold that maintains Member FSD in diagram file said 1-2-1 FunctionID.dl file that is correspond to C++ member FSD; and the 1-3 GlobalList.dl that maintains Global variable and Global Function Interface that is correspond to C++ variable and Global Function Interface in Global location of .h file.

Figure 5:
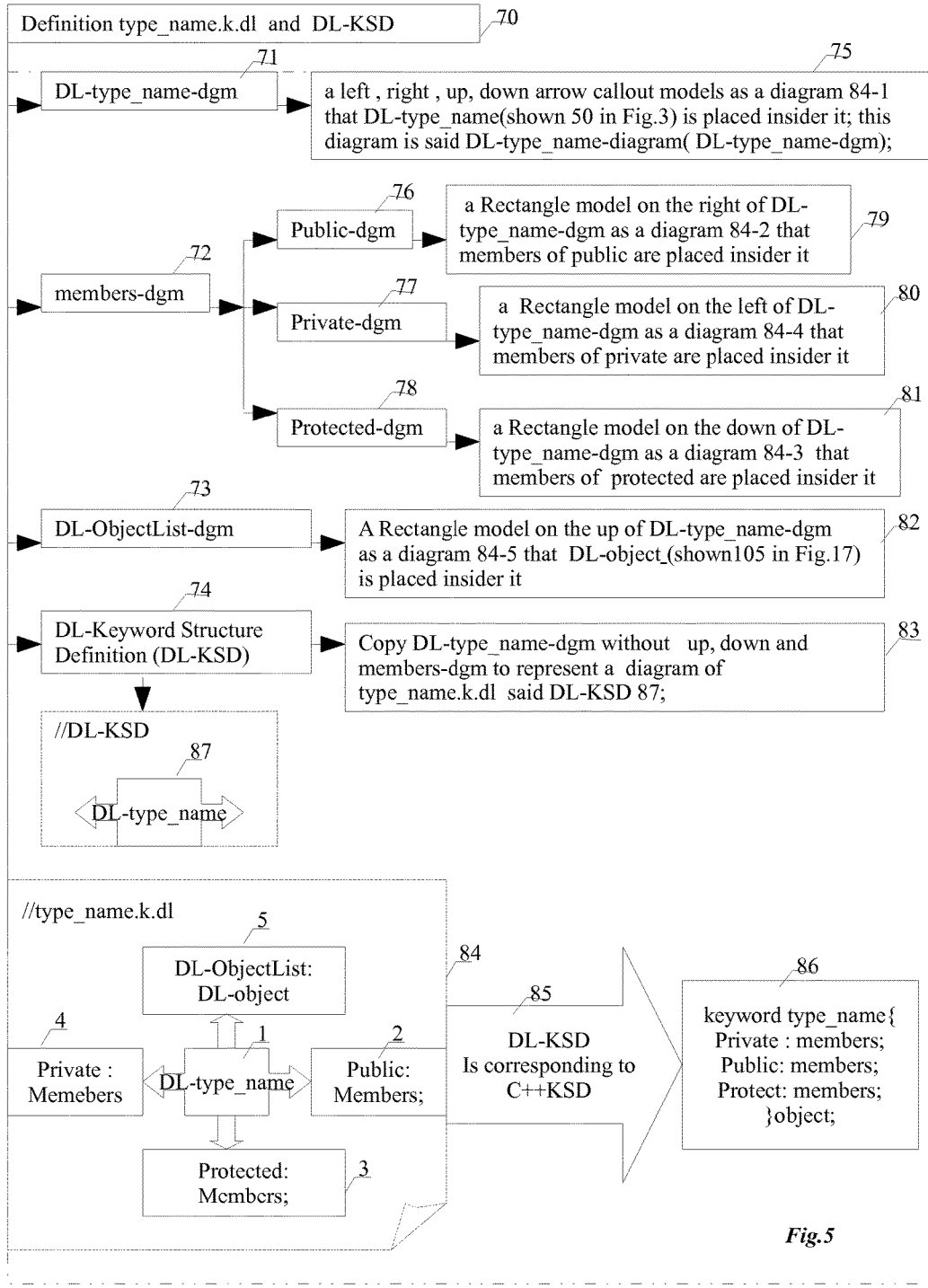
FIG. 5: illustrating a diagram that description Definition type_name.k.dl and DL-KSD.
Figure 6:
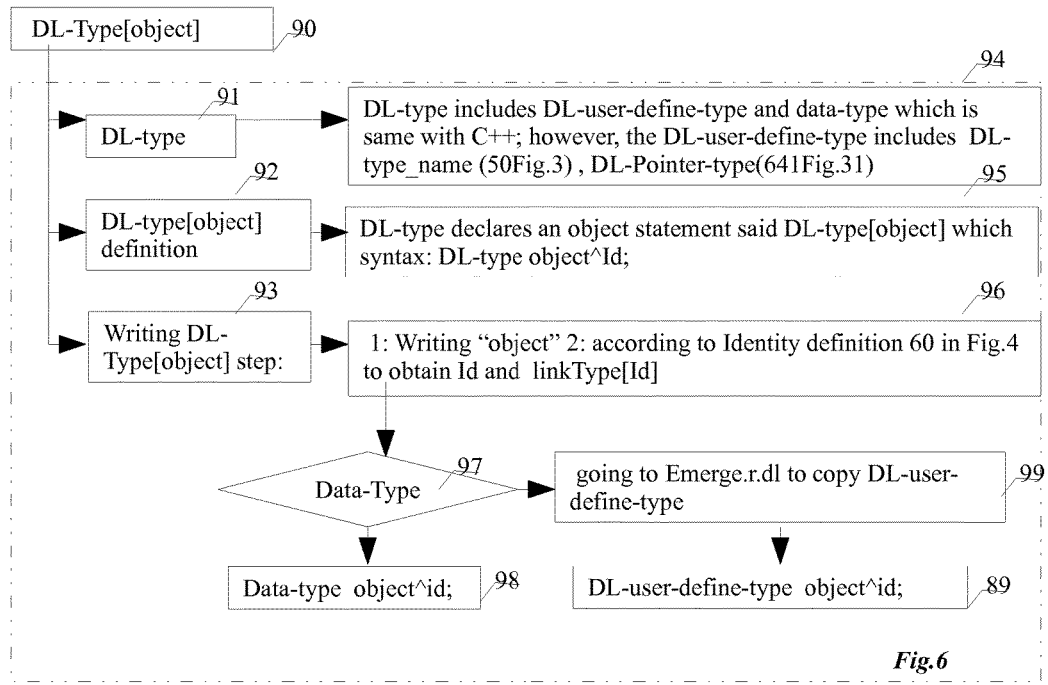
FIG. 6: illustrating a diagram that description DL-Type [object]
Figure 7:
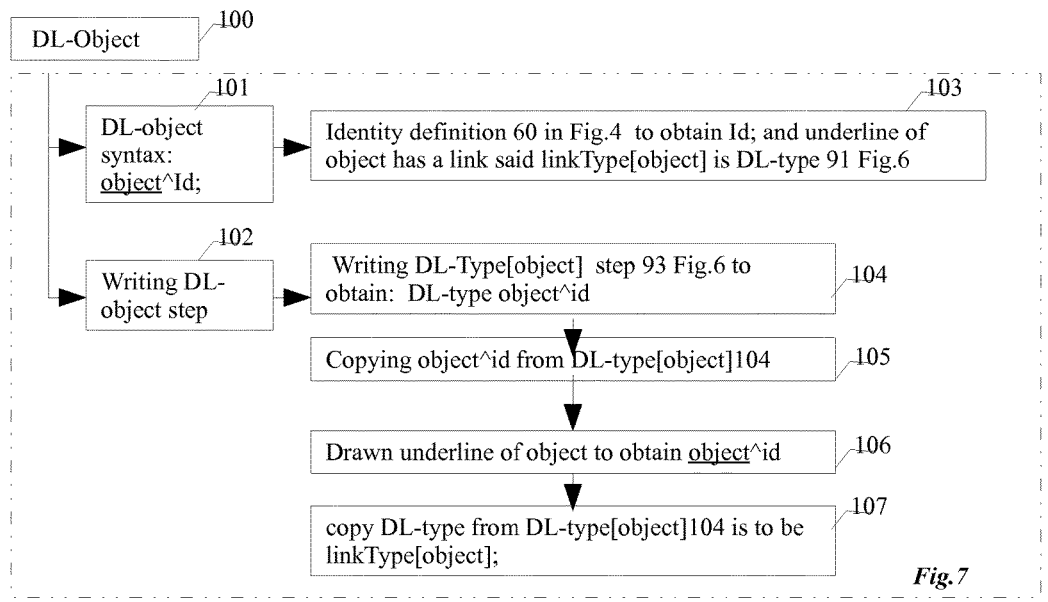
FIG. 7: illustrating a diagram that description DL-Object.
Figure 8:
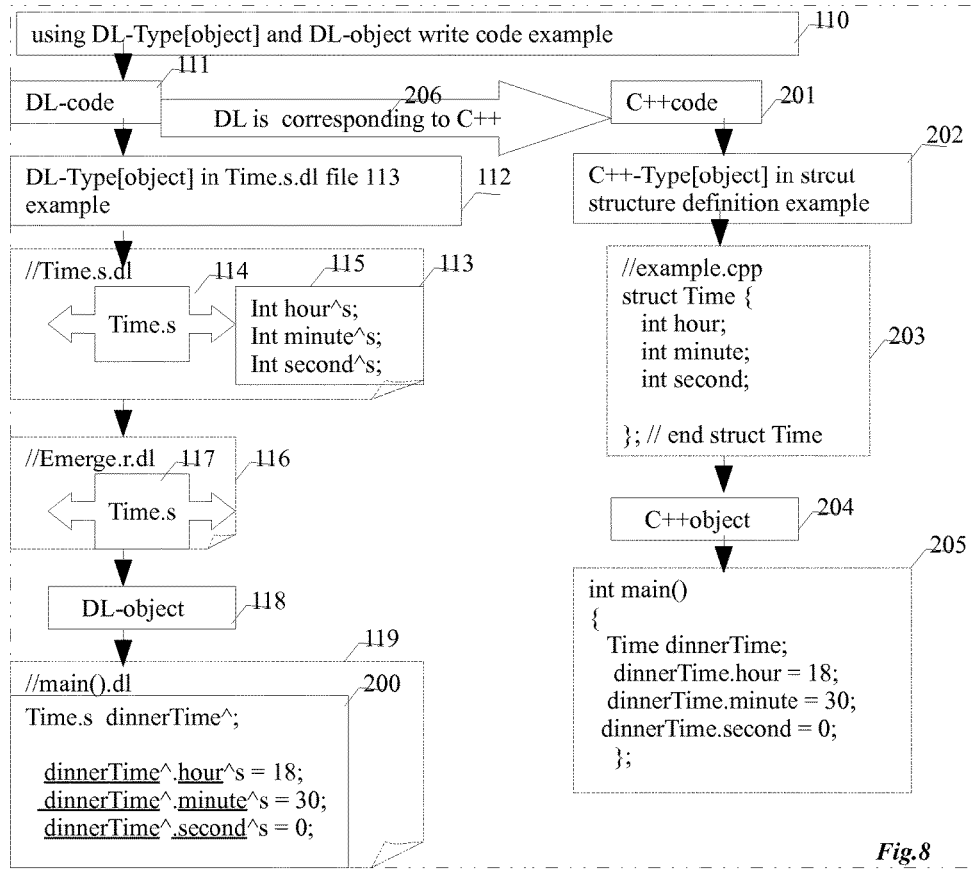
FIG. 8: illustrating a diagram that description Using DL-Type[object] and DL-object write code example.
Figure 9:
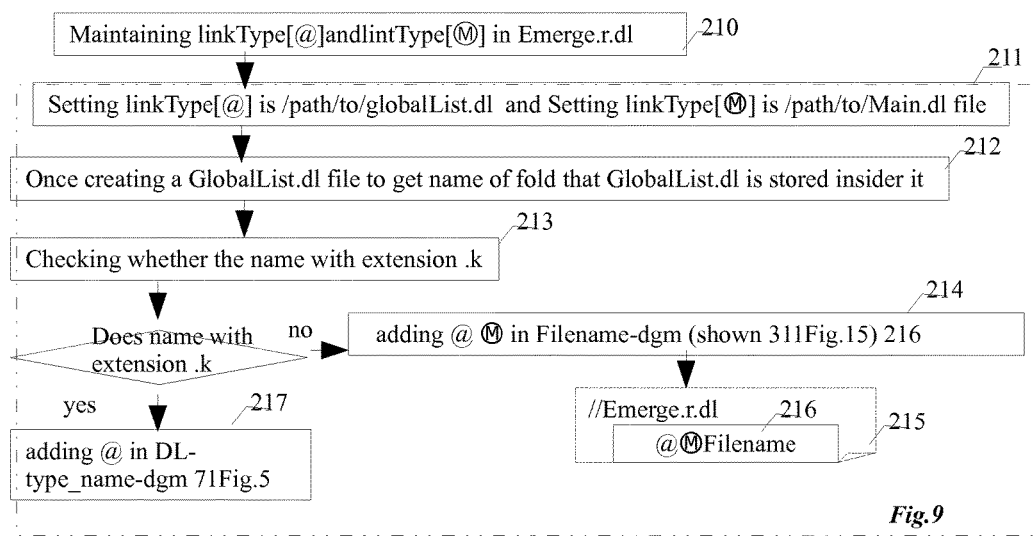
FIG. 9: illustrating a diagram that description Maintaining linkType[@] and linkType[Ⓜ] in Emerge.r.dl.
Figure 10:
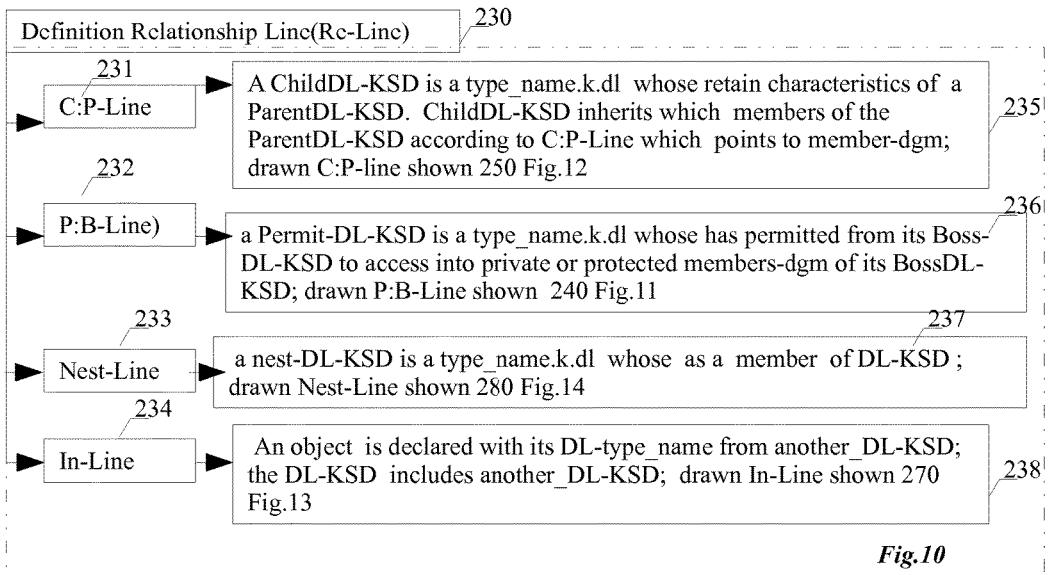
FIG. 10: illustrating a diagram that description Definition Relationship Line (Re-Line)
Figure 11:
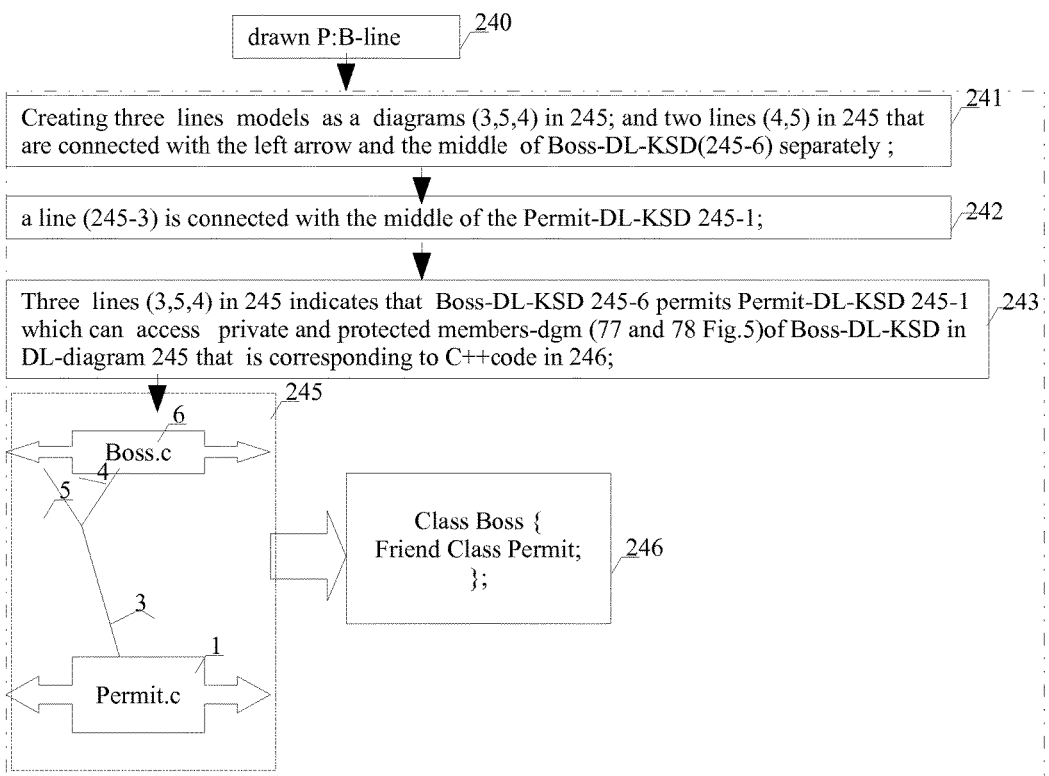
FIG. 11: illustrating a diagram that description drawn P:B-line.
Figures 12, 13:
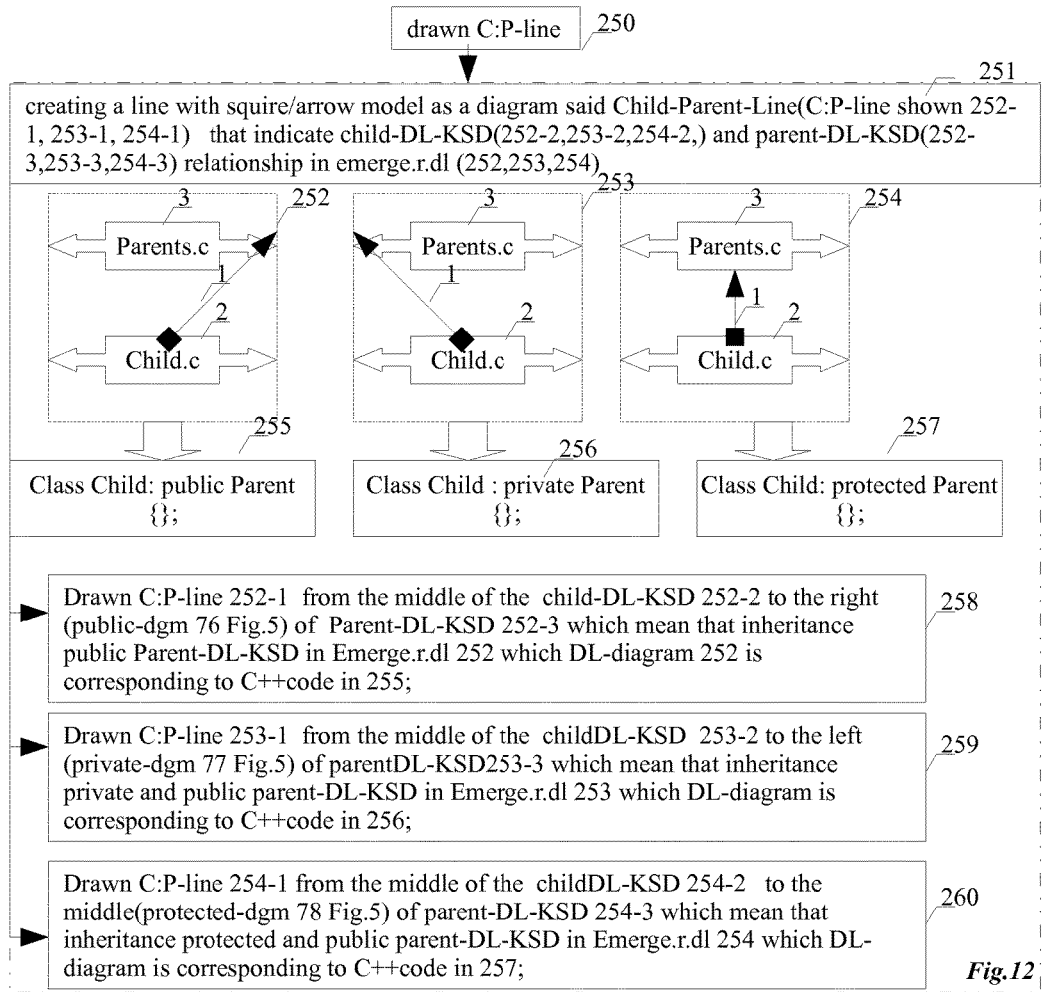
FIG. 12: illustrating a diagram that description drawn C:P-line.
FIG. 13: illustrating a diagram that description Drawn Include-Line (In-line)
Figure 14:
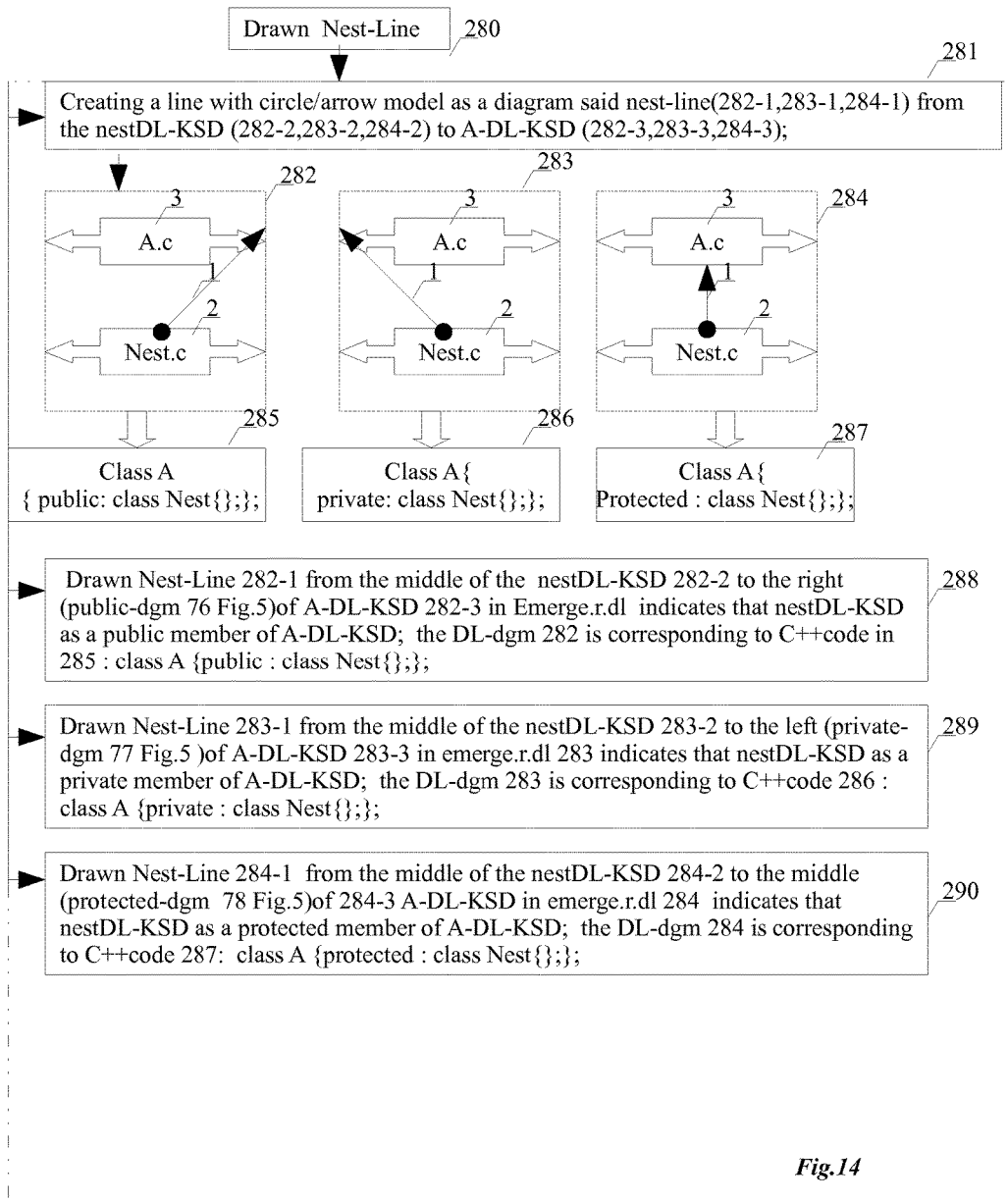
FIG. 14: illustrating a diagram that description Drawn Nest-Line.
Figure 15:
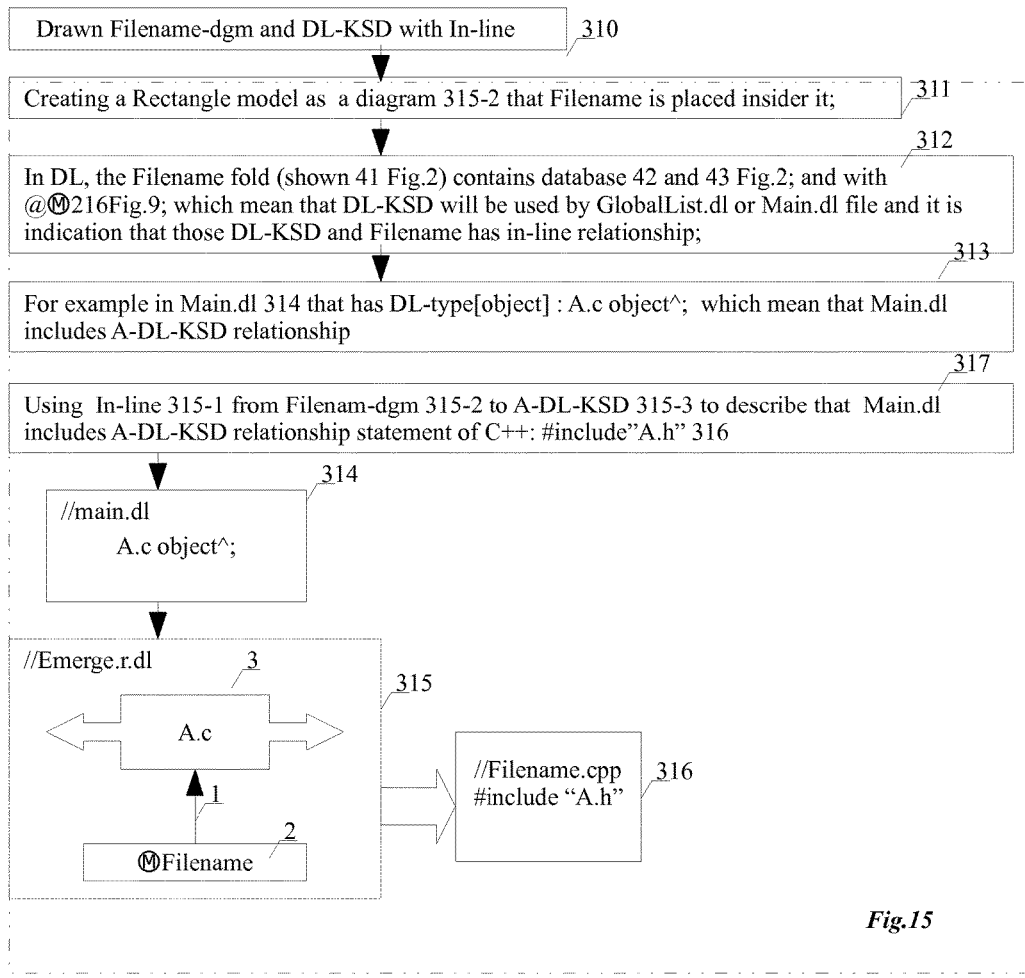
FIG. 15: illustrating a diagram that description Drawn Filename-dgm and DL-KSD with In-line.
Figure 16:
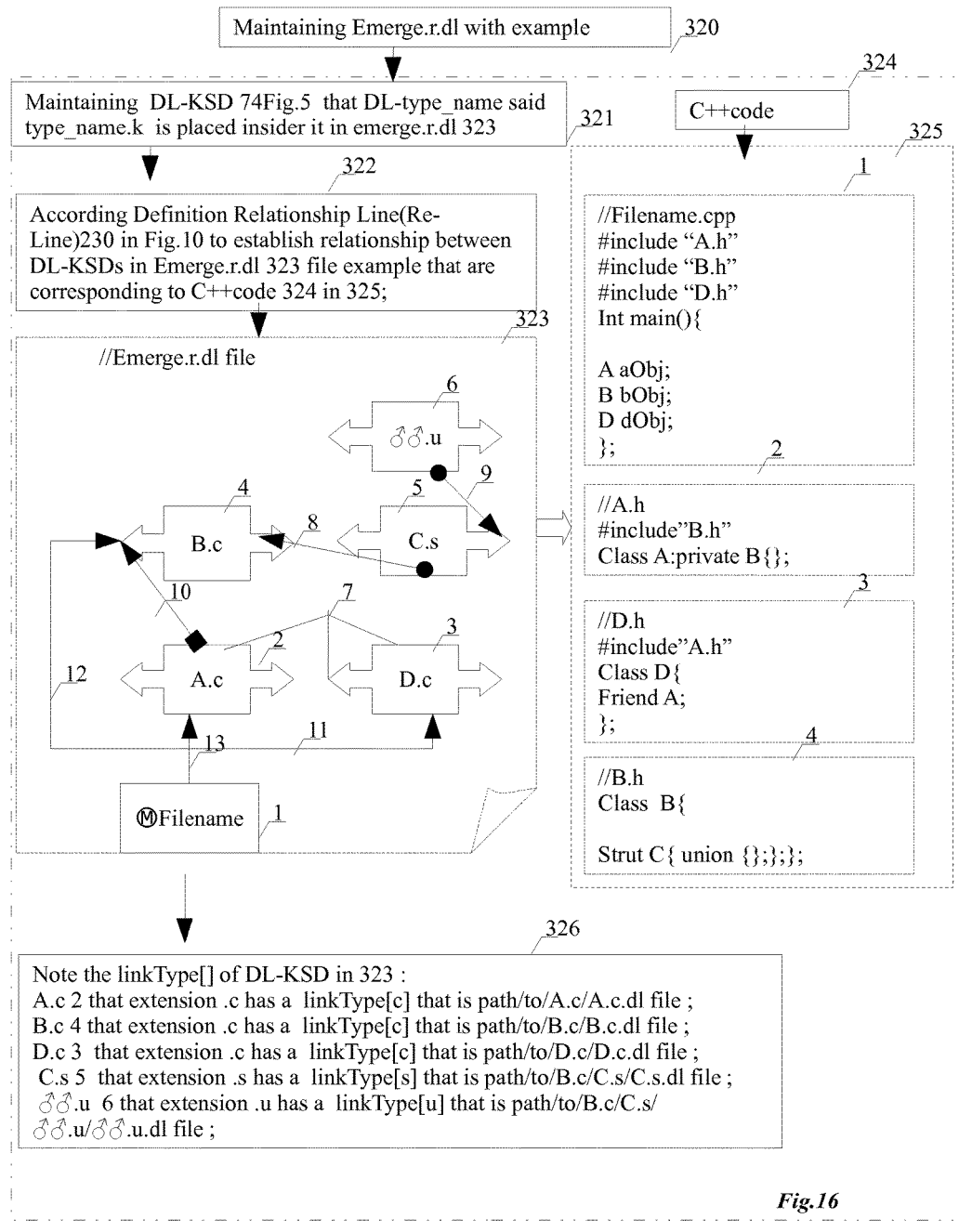
FIG. 16: illustrating a diagram that description Maintaining Emerge.r.dl with example.
Figure 17:
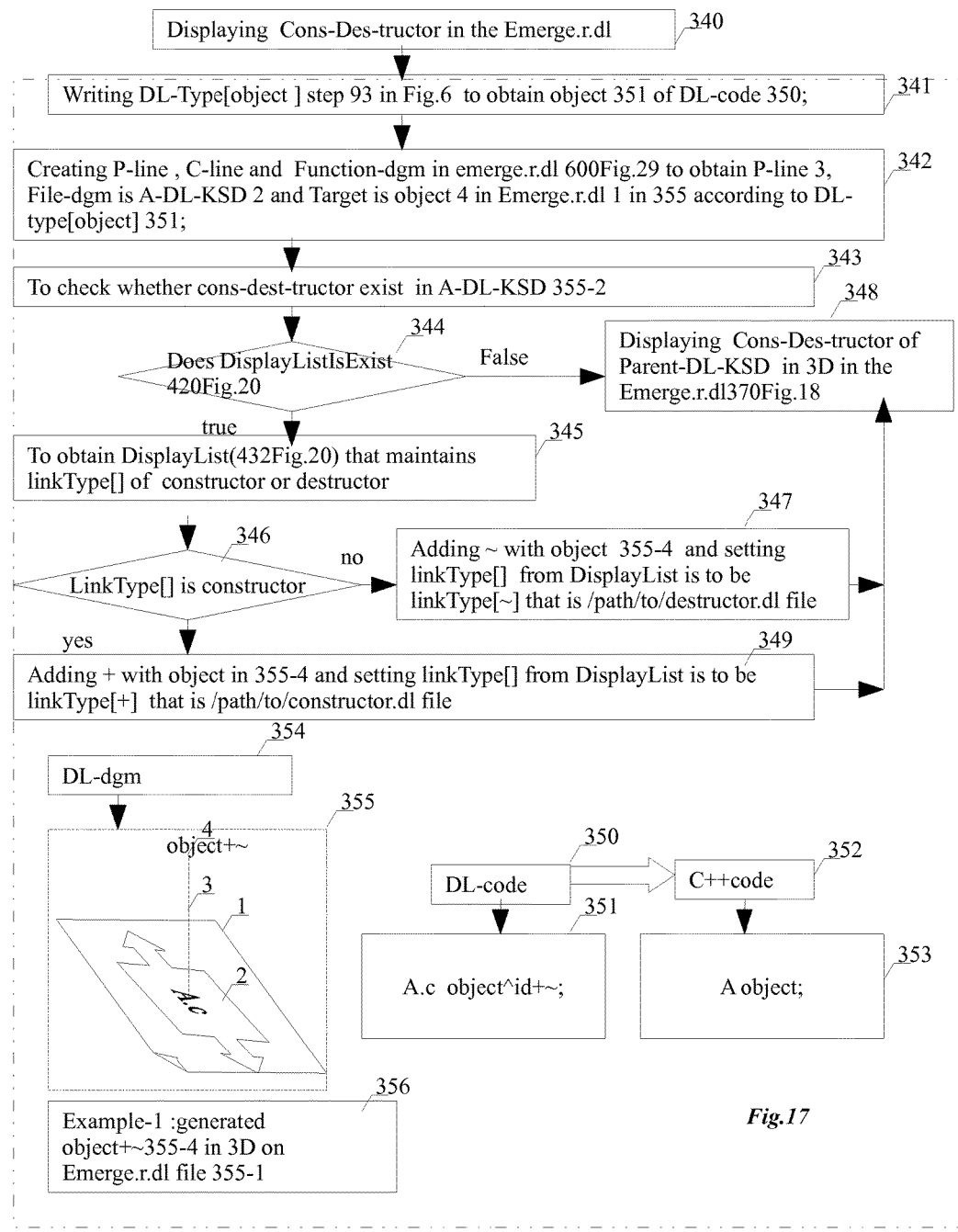
FIG. 17: illustrating a diagram that description Displaying Cons-Des-tructor with 3D in the Emerge.r.dl

FIG. 3: illustrating a Table that description Determination DL-type_name 50 in FIG. 3; The Table 51 that includes 1: DL-type_name definition: a Name is user define to be type that declares an object (i.e., class, struct etc) said Name.k which is called DL-type_name; the extension .k has a link said linkType[k] to a/path/to/a file.dl; when you want to transfer DL to another High-Level Language (HLL), then setting k is first alpha of Keyword that is correspond to KSD of HLL (i.e., C++ Class, then k is "c"; or C++ Struct, then k is "s" so on); which mean that extension k just uses to link type_name.k.dl file (shown 42 database:1-1 in FIG. 2) in DL; in other words, writing DL-code or building DL-diagram do not consider about Keywords in DL;

To understand how to define 1: DL-type_name, we setting DL-type_name in 1 is corresponding to C++ KSD in 2: keyword type_name { } and description linkType[k] in 3; There are three type_name case in Table 51:

1-1: DL-type_name is type_name.k which is corresponding to 2-1 C++ statement: keyword type_name { } object; and its 3-1 linkType[k] is /path/to/type_name.k/type_name.k.dl file;

1-2: DL-type_name is ♂object.k which is corresponding to 2-2 C++ statement: keyword{ }object; which mean that using a symbol ♂ with object to instead of the type_name; and its 3-2 linkType[k] is /path/to/♂object.k/♂object.k.dl file;

1-3: DL-type_name is ♂♂.k which is corresponding to 2-3 C++ statement: keyword type_name{keyword{ };}; which mean that using double symbol ♂♂ to represent a type_name; and its 3-3 linkType[k] is /path/to/type_name.k/♂♂.k/♂♂.k.dl file; which mean that this DL-type_name only uses for nest-DL-type_name;

FIG. 4: illustrating a Table that definition Identity 60 in FIG. 4; in DL, the object has identity that identity of object that is declared with its type statements location at 1 that is corresponding to Identity said ^Id at 2 which has a link said linkType[Id] at 3 in Table 61; There are only Three Identity characters in Table 61:

1:a DL-statement that an object is declared with its DL-type location is to be 2:Identity (Id) said ^id; where id has link that is description in 3:linkType[id];

1-1:the DL-statement is located in GlobalList.dl (shown in 43 database 2 or 42 database 1-3 in FIG. 2); setting Identity of object is 2-1: ^g and 3-1: linkType[g] is /path/to/GlobalList.dl; where, g means global location;

1-2:the DL-statement is located in FunctionID.dl file (shown 42 database in 1-2-1 or 43 database in 4-1 FIG. 2.); setting Identity of object is 2-2: ^l or ^, where l which mean local location, or just ^; if using l, then 3-2:linkType[l] is none, which mean that no linkType[l] exist;

1-3:the DL-statement is located in type_name.k.dl (shown 42 database in 1-1 FIG. 2.), setting Identity of object is 2-3: ^k, where k which mean located in type_name.k.dl file; where 3-3:linkType[k] is /path/to/type_name.k.dl file;

FIG. 5: illustrating a diagram that description Definition type_name.k.dl and DL-KSD 70 in FIG. 5; Type_name.k.dl file contains diagrams that members are placed insider them; First, designing a diagram to representing main diagram that member diagrams will be surrendering with it; this main diagram said 71 DL-type_name-dgm: a left, right, up, down arrow callout models as a diagram 84-1 that DL-type_name (shown 50 in FIG. 3) is placed insider it at step 75;

The members-dgm 72 are surrendering with diagram that meaning about keyword (public, private and protected) according to their location with DL-type_name-dgm 71;

76 Public-dgm: a Rectangle model on the right of DL-type_name-dgm as a diagram 84-2 that members of public are placed insider it at step 79;

77 Private-dgm: a Rectangle model on the left of DL-type_name-dgm as a diagram 84-4 that members of private are placed insider it at step 80;

78 Protected-dgm: a Rectangle model on the down of DL-type_name-dgm as a diagram 84-3 that members of protected are placed insider it at step 81;

73 DL-ObjectList-dgm: A Rectangle model on the up of DL-type_name-dgm as a diagram 84-5 that DL-object (shown 105 FIG. 17) is placed insider it at step 82; mean the DL-object is declared with its DL-type_name in type_name.k.dl file 84;

For representing type_name.k.dl file 84 in a diagram that will be maintained in the Emerge.r.dl file (shown 43 database in 3 FIG. 2) said 74 DL-Keyword Structure Definition (DL-KSD): Copy DL-type_name-dgm without up, down and members-dgm to represent a diagram of type_name.k.dl said DL-KSD 87 at step 83;

The type_name.k.dl 84 diagram is corresponding 85 to C++ KSD 86 that: keyword type_name {private: members; public members; protect: members;}object;

FIG. 6: illustrating a diagram that description DL-Type [object] 90 in FIG. 6;

DL-type 91: DL-type includes DL-user-define-type and data-type which is same with C++; however, the DL-user-define-type includes DL-type_name (shown 50 FIG. 3), DL-Pointer-type (shown 641 FIG. 31) at step 94;

DL-type[object] definition 92: DL-type declares an object statement said DL-type[object] which syntax: DL-type object^Id; at step 95;

Writing DL-Type[object] step 93: 1: Writing "object"; 2: according to Identity definition 60 in FIG. 4 to obtain Id and linkType[Id] at step 96; if DL-type is data-type at step 97, then obtaining DL-type[object]: "data-type object^id;" at step 98; if DL-type is DL-user-define-type; the DL-user-define-type must be placed insider its diagram that are maintained in Emerge.r.dl file before writing DL-type[object]; going to Emerge.r.dl and copying DL-user-define-type from diagram at step 99; then obtaining DL-type[object]: "DL-user-define-type object^Id;" at step 89;

FIG. 7: illustrating a diagram that description DL-Object 100 in FIG. 7;

DL-object syntax: object^Id; 101: Identity definition 60 in FIG. 4 to obtain Id; and underline of object has a link said linkType[object] is DL-type (91 FIG. 6) at step 103;

Writing DL-object step 102: First, the DL-type[object] is wrote before an object is used in statement; according to Writing DL-Type[object] step 93 FIG. 6 to obtain DL-type[object] syntax: "DL-type object^id;" at step 104; after that, Copying object^id from DL-type[object]104 at step 105 and Drawn underline of object to obtain object^id at step 106; copy DL-type from DL-type[object]104 is to be linkType[object] at step 107;

FIG. 8: illustrating a diagram that description using DL-Type[object] and DL-object write code example 110 in FIG. 8; DL-code 111 is corresponding 206 to C++ code 201; In DL, the DL-type[object] is maintained in Time.s.dl file 113 example at step 112 that is corresponding to C++ Type [object] in struct structure definition example at step 202; According to Definition DL-type_name.k.dl and DL-KSD 70 FIG. 5, to obtain Time.s.k.dl file 113 that maintains DL-Time.s-diagram 114 that Time.s is placed insider it with public-diagram 115 that members of DL-type[object]: "int hour^s: int minute^; int second^s; are placed insider it; wherein linkType[s] is /path/to/Time.s.dl file 113; which is corresponding to C++ code 201 in 203: //example.cpp strcut Time{int hour; int minute; int second;};//end strcut Time;

getting DL-KSD (shown 87 in FIG. 5) 117 that is maintained in Emerge.r.dl file 116;

Then going to write DL-object 118 that is maintained in main( ).dl file 119 which is corresponding to C++ object 204 that writing in Main structure definition said int main( ){ }205; main( ).dl file maintains statements 200: "Time.s dinnerTime^; dinnerTime^.hour^s =18;

dinnerTime^.minute^s =30;

dinnerTime^.second^s =0;" according to write DL-type [object] step 93 FIG. 6 and write DL-object step 102 FIG. 7; DL-object 118 is corresponding to C++ statement in main( ) structure definition in 205: "Time dinnerTime; dinnerTime.hour=18; dinnerTime.minute=30; dinnerTime.second=0;"

the Id is "s" that linkType[s] is /path/to/Time.s.dl 113; which mean that even though the main( ).dl and Time.s.dl are maintained in differently fold and file in DL-database, however, from the DL-statement that object with Id, we can view type_name.k.dl file from linkType[k] If Id is k; In other words, the object has Id and linkType[object] characters that make it to be freely DL-object that is used in differently file in DL and also it is advantages for developer check, test and compile programming processing;

FIG. 9: illustrating a diagram that description Maintaining linkType[@] and linkType[Ⓜ] in Emerge.r.dl; 210 in FIG. 9; To convenience utilizes GlobalList.dl and Main.dl file, we setting a symbol @ is representing to GlobalList and Ⓜ is representing to Main.dl file; in other words, @ has a linkType[@] that is path/to/GlobalList.dl and Ⓜ has a linkType[Ⓜ] that is /path/to/Main.dl file at step 211; For the GlobalList.dl file, Once creating a GlobalList.dl file to get name of fold that GlobalList.dl is stored insider it at step 212; Checking whether the name of aFold with extension .k at step 213; Does name with extension .k? if yes, which mean that the fold is type_name.k (shown 42 database 1 in FIG. 2), and adding @ in DL-type_name-dgm (shown 71 in FIG. 5) at step 217; if no, adding @ in Filename-dgm (shown 311 FIG. 5) 216 that is maintained in Emerge.r.dl file 215 at step 214;

For the Main.dl file, once creating a Main.dl that is maintained in the Filename fold (shown 41 in FIG. 2), so that just adding Ⓜ in Filename-diagram 216 at step 214;

FIG. 10: illustrating a diagram that description Definition Relationship Line (Re-Line) 230 in FIG. 10;

There are some feature of object-oriented programming such as inheritance, include, Friend, nest as a relationship-line-diagram to indicates features between DL-KSDs;

231 C:P-Line: a Child-DL-KSD is a type_name.k.dl whose retain characteristics of a Parent-DL-KSD; Child-DL-KSD inherits which members of the Parent-DL-KSD according to C:P-Line which points to member-dgm; drawn C:P-line shown 250 FIG. 12 at step 235;

232 P:B-Line: a Permit-DL-KSD is a type_name.k.dl whose members have access to the private or protected members of its Boss-DL-KSD; drawn P:B-Line shown 240 FIG. 11 at step 236;

233 Nest-Line: A DL-KSD is a type_name.k.dl whose definition is a members of Nest-DL-KSD with Nest-line connection; drawn Nest-Line shown 280 FIG. 14 at step 237;

234 In-Line: An object is declared with its DL-type_name from another DL-KSD; the DL-KSD includes another DL-KSD; drawn In-Line shown 270 FIG. 13 at step 238;

FIG. 11: illustrating a diagram that description drawn P:B-line 240 in FIG. 11; Creating three lines models as a diagrams (3,5,4) in 245; and two lines (4,5) in 245 that are connected with the left arrow and the middle of Boss-DL-KSD (245-6) separately at step 241; a line (245-3) is connected with the middle of the Permit-DL-KSD 245-1 at step 242; Three lines (3,5,4) in 245 indicates that Boss-DL-KSD 245-6 permits Permit-DL-KSD 245-1 which can access private and protected member-dgm (77 and 78 FIG. 5) of Boss-DL-KSD in DL-diagram 245 that is corresponding to C++ code in 246: class Boss {Friend class Permit;}; at step 243;

which mean P:B-line with DL-KSDs diagram language describe statements of C++ Friend; indicating DL-object that is declared with its Permit-DL-KSD can access into private or protected member-dgm of Boss-DL-KSD;

FIG. 12: illustrating a diagram that description drawn C:P-line 250 in FIG. 12; creating a line with squire/arrow model as a diagram said Child-Parent-Line (C:P-line shown 252-1, 253-1, 254-1) that indicate Child-DL-KSD (252-2, 253-2, 254-2,) and Parent-DL-KSD (252-3, 253-3, 254-3) relationship in emerge.r.dl (252,253,254) at step 251; Drawn C:P-line 252-1 from the middle of the Child-DL-KSD 252-2 to the right (Public-dgm 76 FIG. 5) of Parent-DL-KSD 252-3 indicates that inheritance public members of Parent-DL-KSD in Emerge.r.dl 252 which DL-diagram 252 is corresponding to C++ code in 255: class Child: public Parent{ }; at step 258;

Drawn C:P-line 253-1 from the middle of the Child-DL-KSD 253-2 to the left (private-dgm 77 FIG. 5) of Parent-DL-KSD 253-3 indicates that inheritance private and public members of Parent-DL-KSD in Emerge.r.dl 253 which DL-diagram is corresponding to C++ code in 256: class Child: private Parent{ }; at step 259;

Drawn C:P-line 254-1 from the middle of the Child-DL-KSD 254-2 to the middle (Protected-dgm 78 FIG. 5) of Parent-DL-KSD 254-3 indicates that inheritance protected and public members of Parent-DL-KSD in Emerge.r.dl 254 which DL-diagram is corresponding to C++ code in 257: class Child: protected Parent { }; at step 260;

which mean C:P-line with DL-KSDs diagram language describe statements of C++ Derived:Bass class; indicating DL-object that is declared with its Child-DL-KSD can access into member-dgm of Parent-DL-KSD according to C:P-line relationship diagram between Child-Parent-DL-KSDs;

FIG. 13: illustrating a diagram that description Drawn Include-line (In-line) 270 in FIG. 13; Creating a line End with arrow model as a diagram said Include-line (In-Line) 272-1 from the middle of A-DL-KSD 272-2 to the middle of Included-DL-KSD 272-3 at step 271 which mean that the A-DL-KSD can access into public member of InlucdeDL-KSD; The DL-diagram in emerge.r.dl 272 which is corresponding to C++ code in 273: #include "include.h" class A{ } at step 274.

which mean In-line with DL-KSDs diagram language describes statements of C++#Include ".h"; indicating DL-object that is declared with its DL-KSD can access into Public-dgm of Included-DL-KSD according to In-line relationship diagram between DL-KSDs;

FIG. 14: illustrating a diagram that description Drawn Nest-Line 280 in FIG. 14; Creating a line with circle/arrow model as a diagram said nest-line (282-1, 283-1, 284-1)

from the nestDL-KSD (282-2, 283-2, 284-2) to A-DL-KSD (282-3, 283-3, 284-3) at step 281;

Drawn Nest-Line 282-1 from the middle of the nestDL-KSD 282-2 to the right (Public-dgm shown 76 FIG. 5) of A-DL-KSD 282-3 in Emerge.r.dl indicates that nestDL-KSD as a public member of A-DL-KSD; the DL-dgm 282 is corresponding to C++ code in 285: class A {public: class Nest{ };} at step 288;

Drawn Nest-Line 283-1 from the middle of the nestDL-KSD 283-2 to the left (private-dgm 77 FIG. 5) of A-DL-KSD 283-3 in emerge.r.dl 283 indicates that nestDL-KSD as a private member of A-DL-KSD; the DL-dgm 283 is corresponding to C++ code 286: class A {private: class Nest { };} at step 289;

Drawn Nest-Line 284-1 from the middle of the nestDL-KSD 284-2 to the middle (protected-dgm shown 78 FIG. 5) of 284-3 A-DL-KSD in emerge.r.dl 284 indicates that nestDL-KSD as a protected member of A-DL-KSD; the DL-dgm 284 is corresponding to C++ code 287: class A {protected: class Nest{ };} at step 290;

which mean nest-line with DL-KSDs diagram language describe statements of C++ nest class; indicating DL-object that is declared with its DL-KSD can access into member-dgm of nest-DL-KSD according to nest-line relationship diagram between DL-KSDs;

FIG. 15: illustrating a diagram that description Drawn Filename-dgm and DL-KSD with In-line 310 in FIG. 15; Creating a Rectangle model as a diagram 315-2 that Filename is placed insider it at step 311; In DL, the Filename fold (shown 41 FIG. 2) contains database 42 and 43 FIG. 2; and with @Ⓜ216Fig.9; which mean that DL-KSD will be used by GlobalList.dl or Main.dl file and it is indication that those DL-KSD and Filename has in-line relationship at step 312; For example in Main.dl 314 that has DL-type [object]: A.c object^; which mean that Main.dl includes A-DL-KSD relationship at step 313; Using In-line 315-1 from Filenam-dgm 315-2 to A-DL-KSD 315-3 to describe that Main.dl includes A-DL-KSD relationship statement of C++: #include "A.h" 316 at step 317;

FIG. 16: illustrating a diagram that description Maintaining Emerge.r.dl with example 320 in FIG. 16; Maintaining DL-KSD (shown 74 FIG. 5) that DL-type_name said type_name.k is placed insider it in emerge.r.dl 323 at step 321;

According Definition Relationship Line (Re-Line) 230 in FIG. 10 to establish relationship between DL-KSDs in Emerge.r.dl 323 file example that are corresponding to C++ code 324 in 325 at step 322;

In the Emerge.r.dl file 323: an Filename-dgm 1 with A-DL-KSD 2, B-DL-KSD 4 and D-DL-KSD has In-line (12, 13 and 11) separately in Emerge.r.dl file that are corresponding to C++ statement 325-1: //Filename.cpp #include "A.h"  #include  "B.h"  #include  "D.h"; where, Ⓜwith linkType[Ⓜ] that is /path/to/Main.dl file which is corresponding to C++ 325-1: int main( ){ };

There is a C:P-line 10 from A-DL-KSD 2 to the left of B-DL-KSD 4 in 323 file that is corresponding to C++ code 324 in 325-2: //A.h #include"B.h" class A: private B { };

There is a P:B-Line 7 from A-DL-KSD 2 to the left and middle of D-DL-KSD 3 in 323 file that is corresponding to C++ code 324 in 325-3: //D.h #include"A.h" Class D{Friend A;};

The nest-line 8 from the C-DL-KSD 5 to the right of B-DL-KSD 4 and the nest-line 9 from the ♂♂-DL-KSD 6 to the right of C-DL-KSD 5 in File 323 that are corresponding to C++ code 324 in 325-4: //B.h Class B{Strut C{union { };};};

note the linkType[ ] of DL-KSDs in 323 are representing information at step 326:

A.c 2 that extension .c has a linkType[c] that is path/to/A.c/A.c.dl file;

B.c 4 that extension .c has a linkType[c] that is path/to/B.c/B.c.dl file;

D.c 3 that extension .c has a linkType[c] that is path/to/D.c/D.c.dl file;

C.s 5 that extension .s has a linkType[s] that is path/to/B.c/C.s/C.s.dl file;

♂♂.u 6 that extension .u has a linkType[u] that is path/to/B.c/C.s/♂♂.u/♂♂.u.dl file;

From example to obtain building Relationship-line in Emerge.r.dl definition: if the C:P-line; or P:B-line exist between DL-KSDs, then the In-line is not used;

From example we see that DL-KSD and Relationship-line diagram Language is description text of C++ code; in other words, DL that is used to High-Level-Language reduces complex statement and also help programmer and developer more easy way to understand design and analysis project from the Diagram Language;

FIG. 17: illustrating a diagram that description Displaying Cons-Des-tructor in the Emerge.r.dl 340 in FIG. 17; Writing DL-Type[object] step 90 in FIG. 6 to obtain object 351 of DL-code 350 at step 341; Creating P-line, C-line and Function-dgm in emerge.r.dl 600 FIG. 29 to obtain P-line 3, and File-dgm is A-DL-KSD 2 and Target is object 4 in Emerge.r.dl 1 in 355 according to DL-type[object] 351 at step 342; To check whether cons-dest-tructor exist in DL-KSD 355-2 at step 343; processing Does Display List Is Exist 420 FIG. 20 at step 344? if return False, just going to step 348; If return true; To obtain DisplayList (432 FIG. 20) that maintains linkType[ ] of constructor or destructor at step 345; then, going to check whether the linkType[ ] from DisplayList is constructor 346? if yes, Adding + with object in 355-4 and setting linkType[ ] from DisplayList is to be linkType[+] that is /path/to/constructor.dl file at step 349, then going to step 348; if no, Adding ~ with object 355-4 and setting linkType[ ] from DisplayList is to be linkType[~] that is /path/to/destructor.dl file at step 347; then going to step 348; at step 348: processing Displaying Cons-Des-tructor of Parent-DL-KSD in 3D in the Emerge.r.dl 370 FIG. 18

Figure 18:
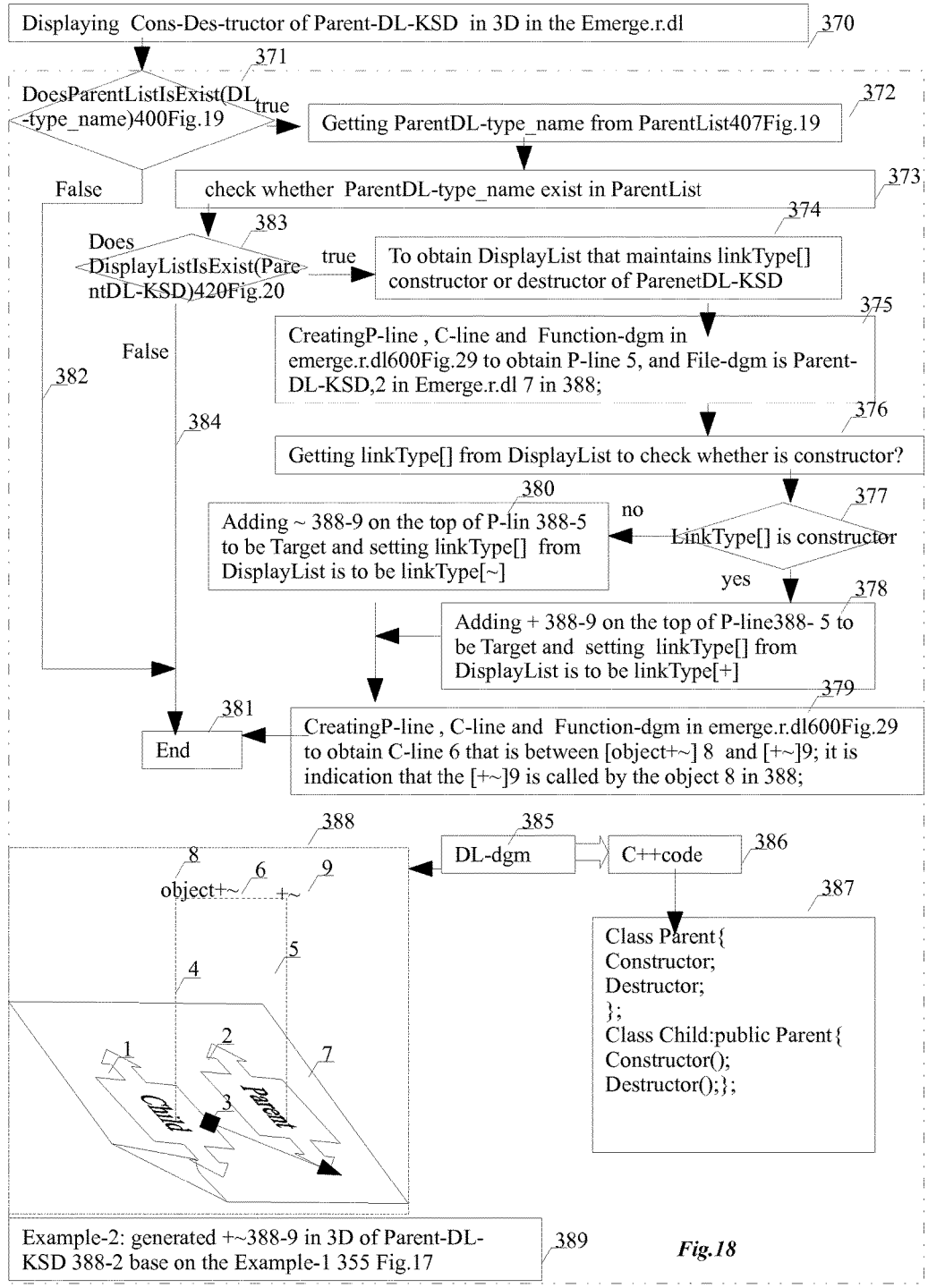
FIG. 18: illustrating a diagram that description Displaying Cons-Des-tructor of Parent-DL-KSD with 3D in the Emerge.r.dl.
Figure 19:
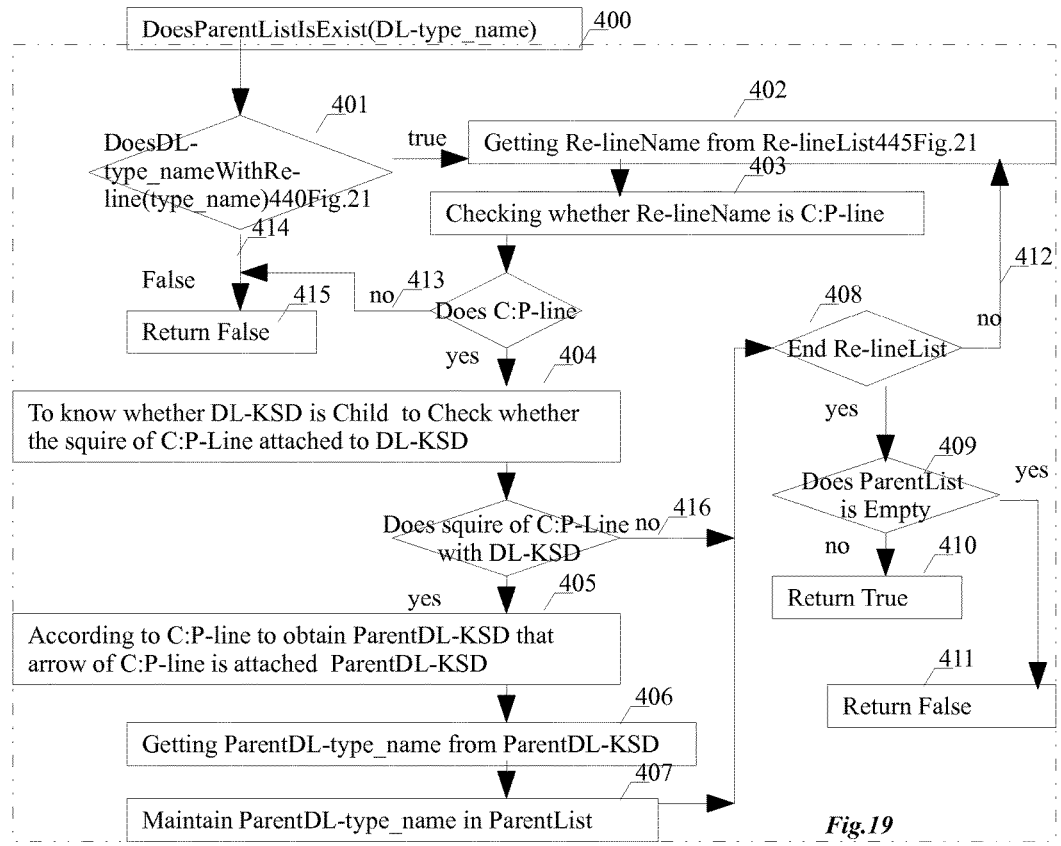
FIG. 19: illustrating a diagram that description Does Parent List Is Exist.

Example-1:generated object+~355-4 in 3D on Emerge.r.dl file 355-1 that shown in DL-dgm 354 at step 356;

The DL-dgm 354 is establishment according to The DL-code 350 of DL-type[object] that is writing: A.c object^ld; in 351 is corresponding to C++ code 352: A object; in 353; From example we see that the constructor or destructor is displayed in 3D; it is verify that the text-to-diagram is exist in DL;

FIG. 18: illustrating a diagram that description Displaying Cons-Des-tructor of Parent-DL-KSD in 3D in the Emerge.r.dl 370 in FIG. 18; First, to check whether Parent-DL-KSD exist in emerge.r.dl, going to process Does Parent List Is Exist (DL-type_name) 400 FIG. 19 at step 371? if true, Getting ParentDL-type_name from ParentList (shown 407 in FIG. 19) at step 372; check whether ParentDL-type_name exist in ParentList at step 373; processing Does DisplayList Is Exist(Parent-DL-KSD) 420 FIG. 20 at step 383; if true, To obtain DisplayList that maintains linkType[ ] constructor or destructor at step 374; Creating P-line, C-line and Function-dgm in emerge.r.dl 600 FIG. 29 to obtain P-line 5, and File-dgm is Parent-DL-KSD 2 in Emerge.r.dl 7 in 388 at step 375; Getting linkType[ ] from DisplayList to check whether is constructor At step 376; LinkType[ ] is constructor? at step 377; if yes, Adding +388-9 on the top of P-line 388-5 is to be Target and setting linkType[ ] from DisplayList is to be linkType[+] at step 378; then going to step 379; if no, Adding ~388-9 on the top of P-line 388-5 is to be Target and setting linkType[ ] from DisplayList is to be linkType[~] at step 380 and going to step 379;

at step 379: Creating P-line, C-line and Function-dgm in emerge.r.dl 600 FIG. 29 to obtain C-line 6 that is between [object+~] 8 and [+~]9; it is indication that the [+~]9 is called by the object 8 in 388; and going to End at step 381; if False 384 and 382, just going to End at step 381;

Example-2: generated+~388-9 in 3D of Parent-DL-KSD 388-2 base on the Example-1 355 FIG. 17 at step 389; the DL-dgm 385 that display in 388 is correspond to C++ code 386 in 387 text:

diagrams (Child-DL-KSD 1, Parent-DL-KSD 2, C:P-Line 3) in emerge.r.dl 7 file in 388 is corresponding to C++ code 386 in 387: Class Parent{ }; Class Child:public Parent{ };

the diagram said P-line 4, object+~8 in emerge.r.dl 7 in 388 is corresponding to C++ code 386 in 387: Class Child {Constructor;Destructor;};

the diagram said P-line 5, and +~9 in emerge.r.dl 7 in 388 is corresponding to C++ code 386 in 387: Class Parent {Constructor( )Destructor( )};

From example-2 we see: once DL-type[object] is existing, the constructor or destructor will be display with 3D on the Emerge.r.dl file; it is very convenience for programer and developer to understand project from diagrams at grace;

FIG. 19: illustrating a diagram that description Does Parent List Is Exist(DL-type_name) 400 in FIG. 19; First, checking whether DL-KSD that DL-type_name is placed insider it has Re-line exist, going to process Does DL-type_name With Re-line (type_name) 440 FIG. 21 at step 401; if true, Getting Re-line Name from Re-LineList 445 FIG. 21 at step 402; then going to Checking whether Re-lineName is C:P-line at step 403, Does C:P-line? If yes, To know whether DL-KSD is Child to Check whether the squire of C:P-Line attached to DL-KSD at step 404, Does squire of C:P-Line with DL-KSD? If yes, According to C:P-line to obtain Parent-DL-KSD that arrow of C:P-line is attached Parent-DL-KSD at step 405 and Getting ParentDL-type_name from Parent-DL-KSD at step 406 to Maintain ParentDL-type_name in ParentList at step 407 and going to step 408; if no at step 416, just going to step 408;

at step 408: check whether end Re-line List, End Re-lineList? If yes, check whether ParentList is empty at step 409? if no, return True 410, if yes, Return False 411;

if no 412, going to back step 402 for getting Re-line Name and repeat step until end Re-lineList.

Figure 20:
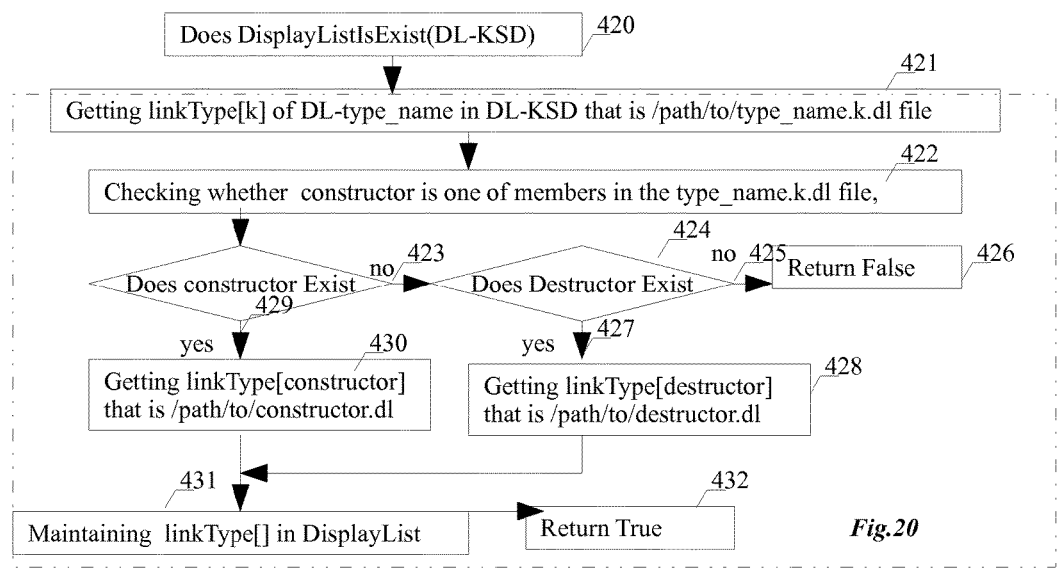
FIG. 20: illustrating a diagram that description Does Display List Is Exist.

If no 413 and False 414, going to return False at step 415;

FIG. 20: illustrating a diagram that description Does Display List Is Exist(DL-KSD) 420 in FIG. 20; Getting linkType[k] of DL-type_name in DL-KSD that is /path/to/type_name.k.dl file at step 421; Checking whether constructor is one of members in the type_name.k.dl file at step 422; Does Constructor Exist? If yes 429, going to Getting linkType[constructor] that is /path/to/constructor.dl from constructor at step 430; then going to step 431; if no 423, Does Destructor Exist 424? if yes 427, Getting linkType[destructor] that is /path/to/destructor.dl from destructor at step 428, then going to step 431;

at step 431: Maintaining linkType[ ] in DisplayList and return True at step 432.

if no 425, return False at step 426.

Figure 21:
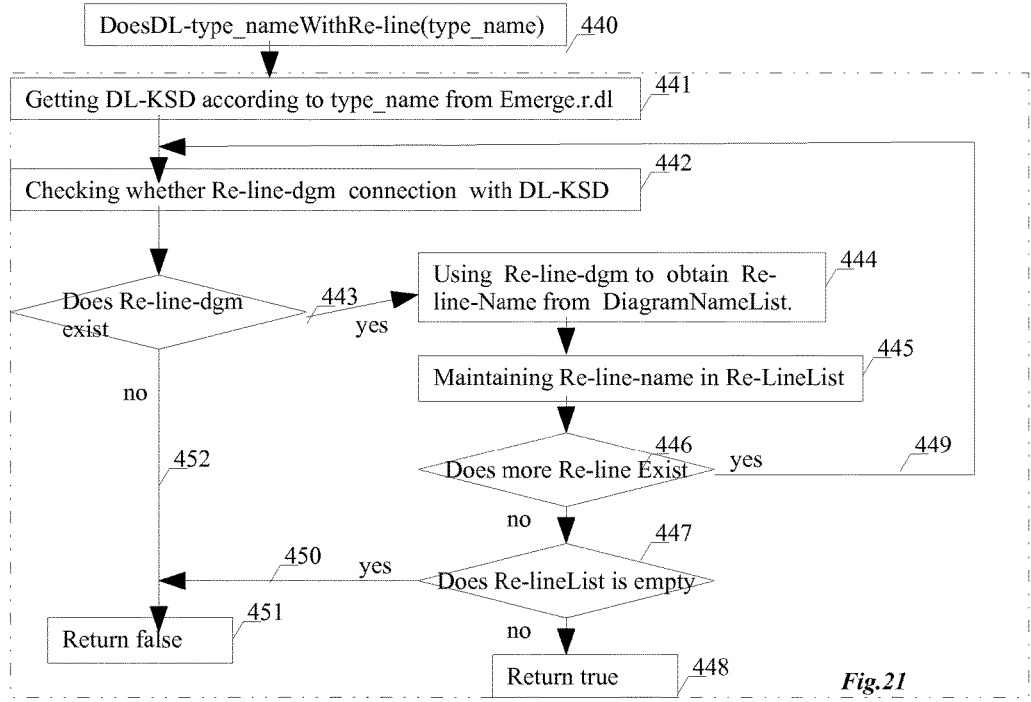
FIG. 21: illustrating a diagram that description Does DL-type_name With Re-line.

FIG. 21: illustrating a diagram that description Does DL-type_name With Re-line(type_name) 440 in FIG. 21; Getting DL-KSD according to type_name from Emerge.r.dl at step 441; Checking whether Re-line-dgm connection with DL-KSD at step 442; Does Re-line-dgm exist? If yes 443, Using Re-line-dgm to obtain Re-line-Name from Diagram-NameList at step 444 and Maintaining Re-line-name in Re-LineList at step 445; checking whether more Re-line exist at step 446? if no, checking whether Re-LineList is empty at step 447? If no, return True at step 448, if yes 450 and no 452, going to return False at step 451; if yes 449, going back step 442 to check whether more Re-line-dgm exist.

Figure 22:
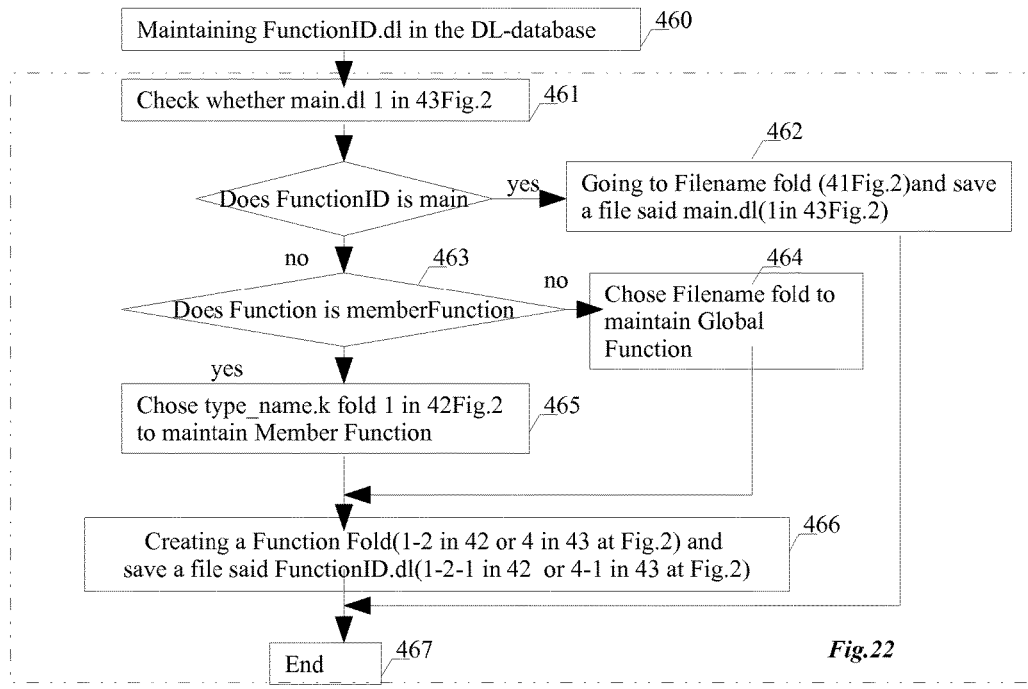
FIG. 22: illustrating a diagram that description Maintaining FunctionID.dl in the DL-database.
Figure 23:
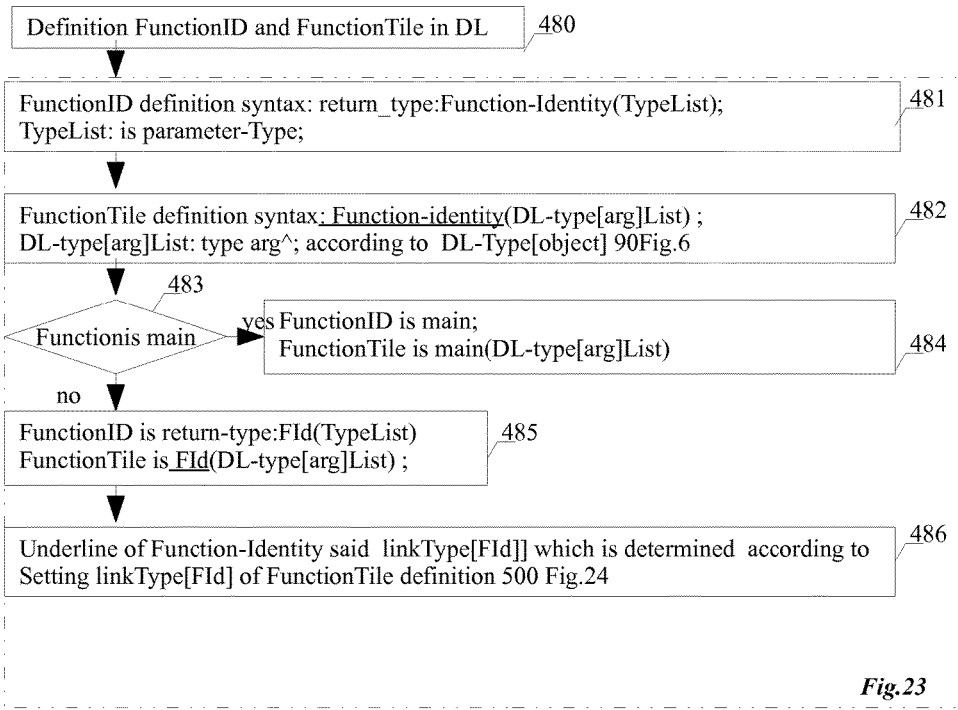
FIG. 23: illustrating a diagram that description Definition FunctionID and FunctionTile in DL.
Figure 24:
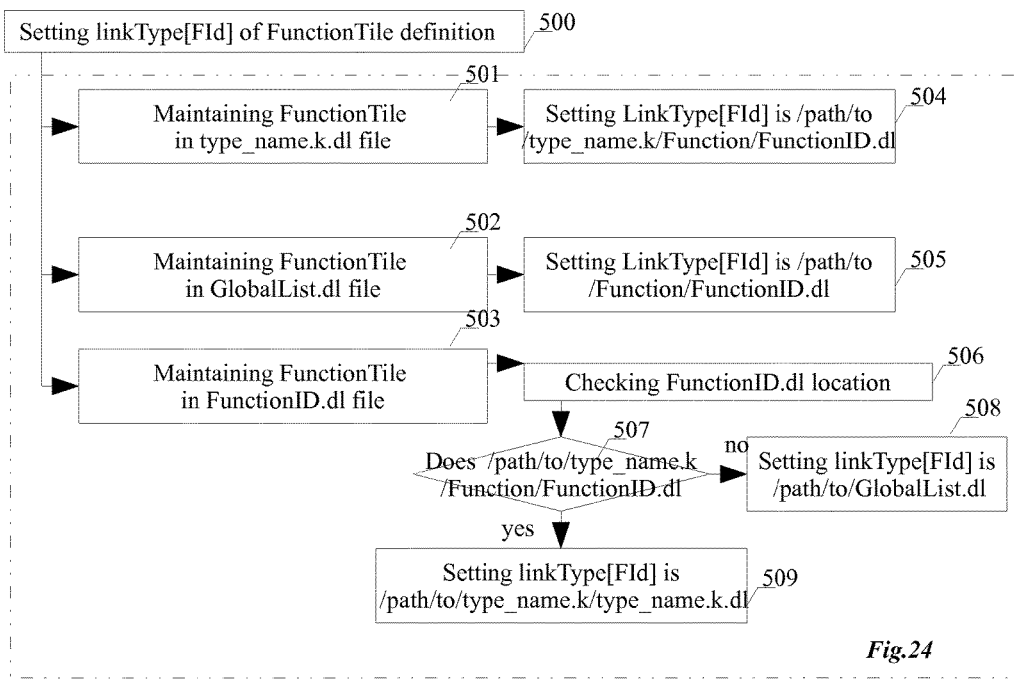
FIG. 24: illustrating a diagram that description Setting linkType[FId] of FunctionTile definition

FIG. 22: illustrating a diagram that description Maintaining FunctionID.dl in the DL-database 460 in FIG. 22; First, Check whether main.dl 1 in 43 FIG. 2 at step 461 which mean that you want to write main.dl file; Does FunctionID is main? If answer is yes, Going to Filename fold (shown 41 FIG. 2) and save a file said main.dl (shown 1 in 43 FIG. 2) at step 462 and going to end 467; if answer is no, then whether you want to maintain member Function at step 463? if answer is yes, Chose type_name.k fold (shown 1 in 42 FIG. 2) that FunctionID is its member at step 465 and then going to step 466; if answer is no, chose Filename fold that FunctionID is Global Function at step 464 and then going to step 466;

at step 466: Creating a Function Fold (shown 1-2 in 42 or 4 in 43 at FIG. 2) that maintains a file said FunctionID.dl (shown 1-2-1 in 42 or 4-1 in 43 at FIG. 2) and going to end at step 467;

FIG. 23: illustrating a diagram that description Definition FunctionID and FunctionTile in DL 480 in FIG. 23; FunctionID definition syntax: return_type:Function-Identity (TypeList); TypeList: is parameter-type; which mean that using type ensure FunctionID which is unique in the Function Fold at step 481; For Function Interface said Function-Tile that its definition syntax: Function-identity(DL-type [arg]List); DL-type[arg]List: type arg^; ; according to DL-Type[object] 90 FIG. 6 at step 482; checking whether Function is main function at step 483, if yes, FunctionID is main; FunctionTile is main(DL-type[arg]List) at step 484; if no, FunctionID is return-type:FId(TypeList) and Function-Tile is FId(DL-type[arg]List) at step 485; Underline of Function-Identity said linkType[FId]] which is determined according to Setting linkType[FId] of FunctionTile definition 500 FIG. 24 at step 486;

FIG. 24: illustrating a diagram that description Setting linkType[FId] of FunctionTile definition 500 in FIG. 24;

Maintaining FunctionTile in type_name.k.dl file at step 501: Setting LinkType[FId] is /path/to/type_name.k/Function/FunctionID.dl at step 504;

Maintaining FunctionTile in GlobalList.dl file at step 502: Setting LinkType[FId] is /path/to /Function/Function-ID.dl at step 505;

Maintaining FunctionTile in FunctionID.dl file at step 503: Checking FunctionID.dl location at step 506; Does/path/to/type_name.k/Function/FunctionID.dl at step 507? if yes, Setting linkType[FId] is /path/to/type_name.k/type_name.k.dl at step 509; if no, Setting linkType[FId] is /path/to/GlobalList.dl at step 508.

Figure 25:
FIG. 25: illustrating a diagram that description Maintaining FunctionTile.
Figure 26:
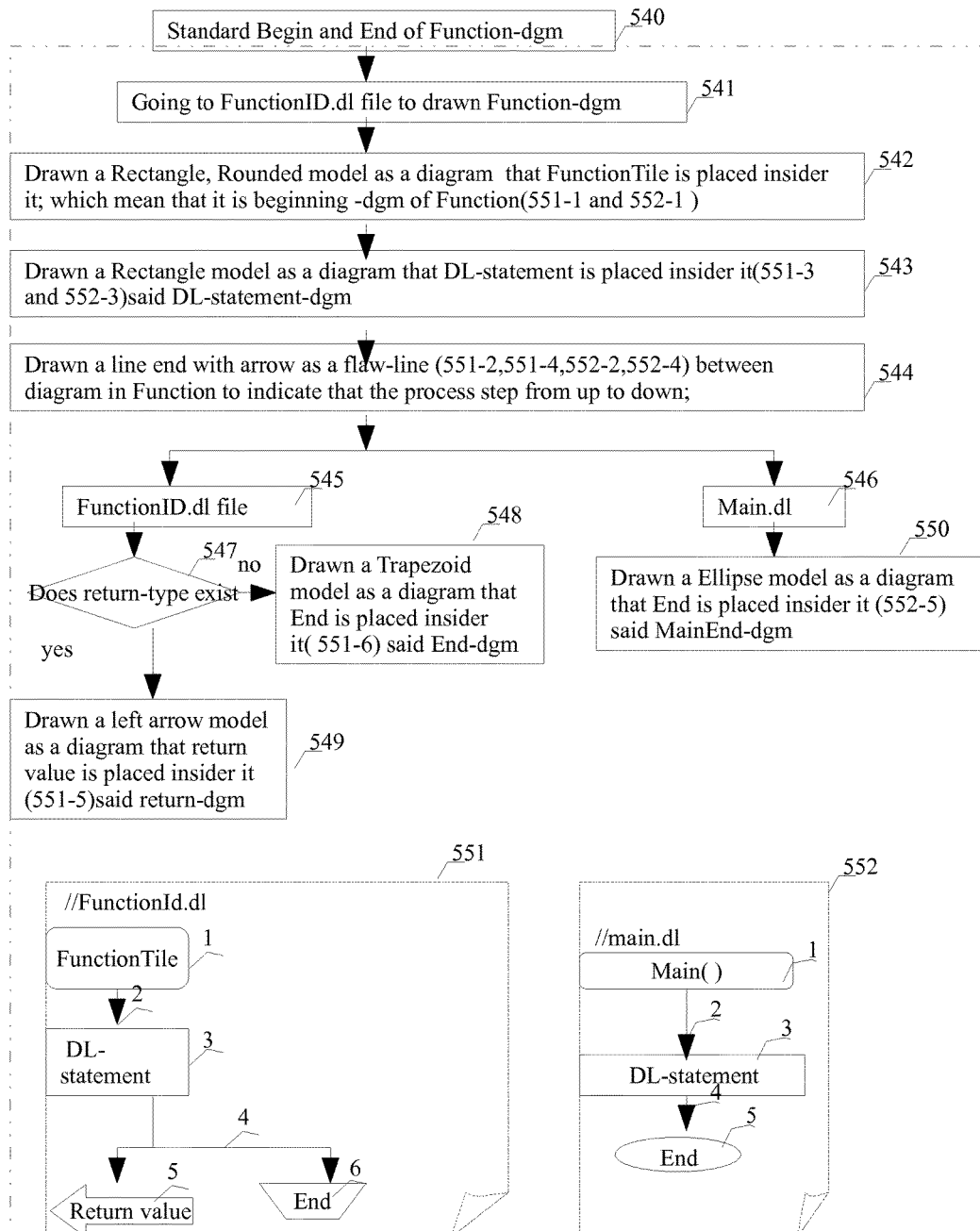
FIG. 26: illustrating a diagram that description Standard Begin and End of Function-dgm.

FIG. 25: illustrating a diagram that description Maintaining FunctionTile 520 in FIG. 25;

1) Maintaining Member Function at step 521;

Maintaining FunctionTile in type_name.k.dl at step 524: Setting linkType[FId] that is /path/to/type_name.k/Function/FunctionID.dl according to Setting linkType [FId] of FunctionTile definition 500 FIG. 24 at step 526; Chose member-dgm (72 FIG. 5) that FunctionTile is placed insider it at step 527;

Maintaining FunctionTile in FunctionID.dl at step 525:
Setting linkType[FId] that is /path/to/type_name.k/
type_name.k.dl according to Setting linkType[FId] of
FunctionTile definition 500 FIG. 24 at step 528; Chose
beginning-dgm that FunctionTile is placed insider it
according to Standard Begin and End of Function-dgm
540 FIG. 26 at step 529;

2) Maintaining Global Function at step 522:

Maintaining FunctionTile in GlobalList.dl at step 531:
Setting linkType[FId] that is /path/to/Filename/Function/FunctionID.dl according to Setting linkType[FId]
of FunctionTile definition 500 FIG. 24 at step 533;
Maintaining FunctionTile in the GlobalList.dl at step 534;

Maintaining FunctionTile in FunctionID.dl at step 532:
Setting linkType[FId] that is /path/to/Filename/GlobalList.dl according to Setting linkType[FId] of FunctionTile definition 500 FIG. 24 at step 535; Chose beginning-dgm that FunctionTile is placed insider it according to Standard Begin and End of Function-dgm 540 FIG. 26 at step 536;

FunctionTile with linkType[FId] is to be Function Interface, even though call FunctionTile from differently file, the FunctionID.dl file always you can find in order to linkType [FId] information; it is solution the gab problem between FunctionTile and FunctionID in differently location in DL-database;

FIG. 26: illustrating a diagram that description Standard Begin and End of Function-dgm 540 in FIG. 26; Going to FunctionID.dl file to drawn Function-dgm at step 541; Drawn a Rectangle, Rounded model as a diagram that FunctionTile is placed insider it; which mean that it is beginning-dgm of Function (551-1 and 552-1) at step 542; Drawn a Rectangle model as a diagram that DL-statement is placed insider it (551-3 and 552-3) at step 543; Drawn a line end with arrow as a flaw-line (551-2, 551-4,552-2, 552-4) between diagram in Function to indicate that the process step from up to down at step 544;

FunctionID.dl file 545: Does return-type exist at step 547?
If yes, Drawn a left arrow model as a diagram that return value is placed insider it (551-5) said return-dgm at step 549; it is indication that End Function program with return value; if no, Drawn a Trapezoid model as a diagram that End is placed insider it (551-6) said End-dgm at step 548 to indicate that End Function program without return value;

Main.dl 546: Drawn an Ellipse model as a diagram that End is placed insider it (552-5) said MainEnd-dgm at step 550; it is indication that End Main program.

Figure 27:
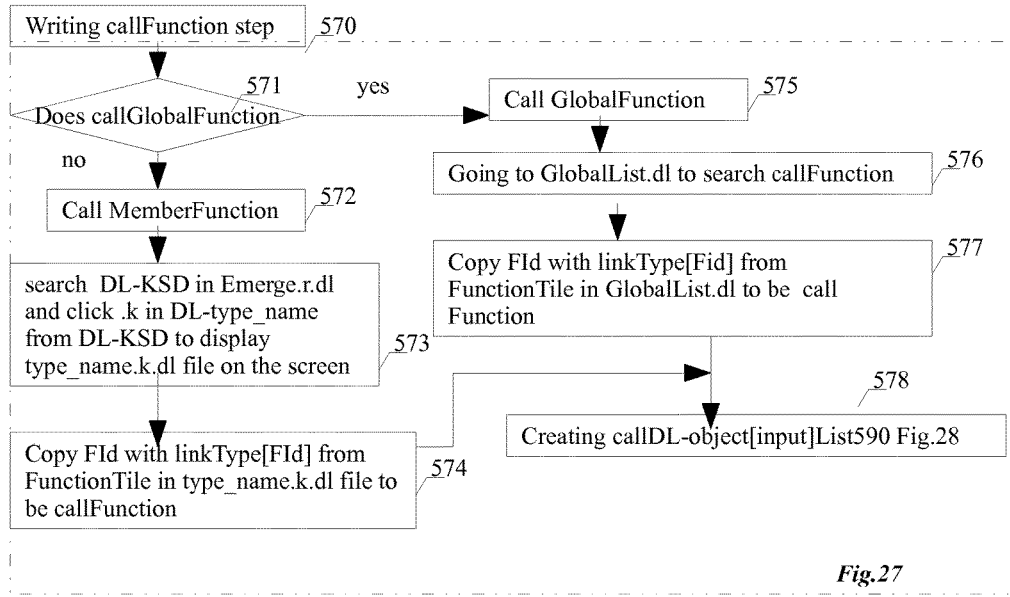
FIG. 27: illustrating a diagram that description Writing call Function step.
Figure 28:
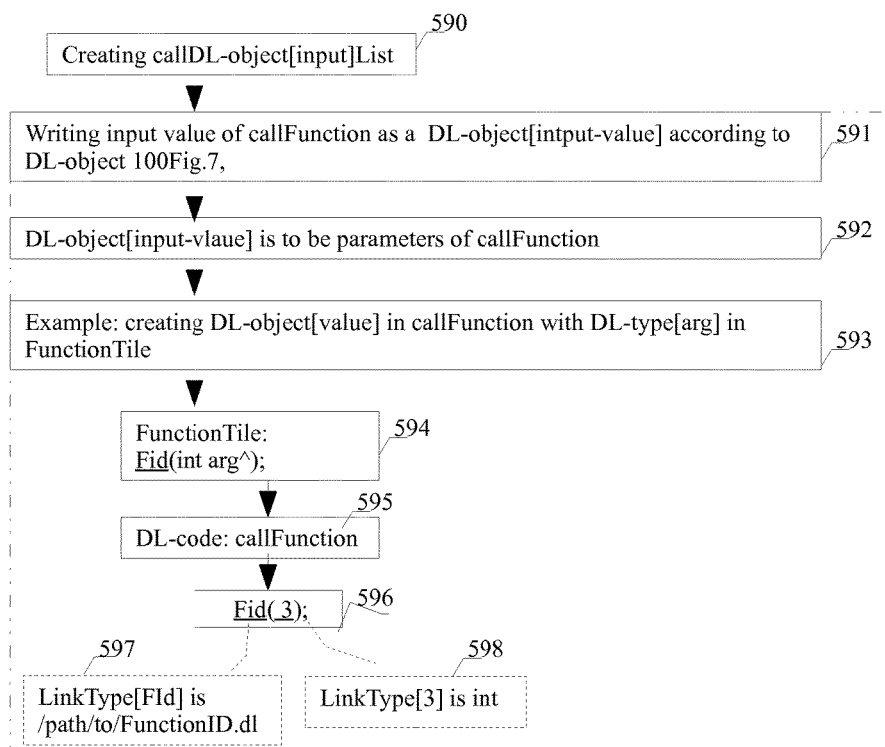
FIG. 28: illustrating a diagram that description Creating call DL-object[input]List.
Figure 30:
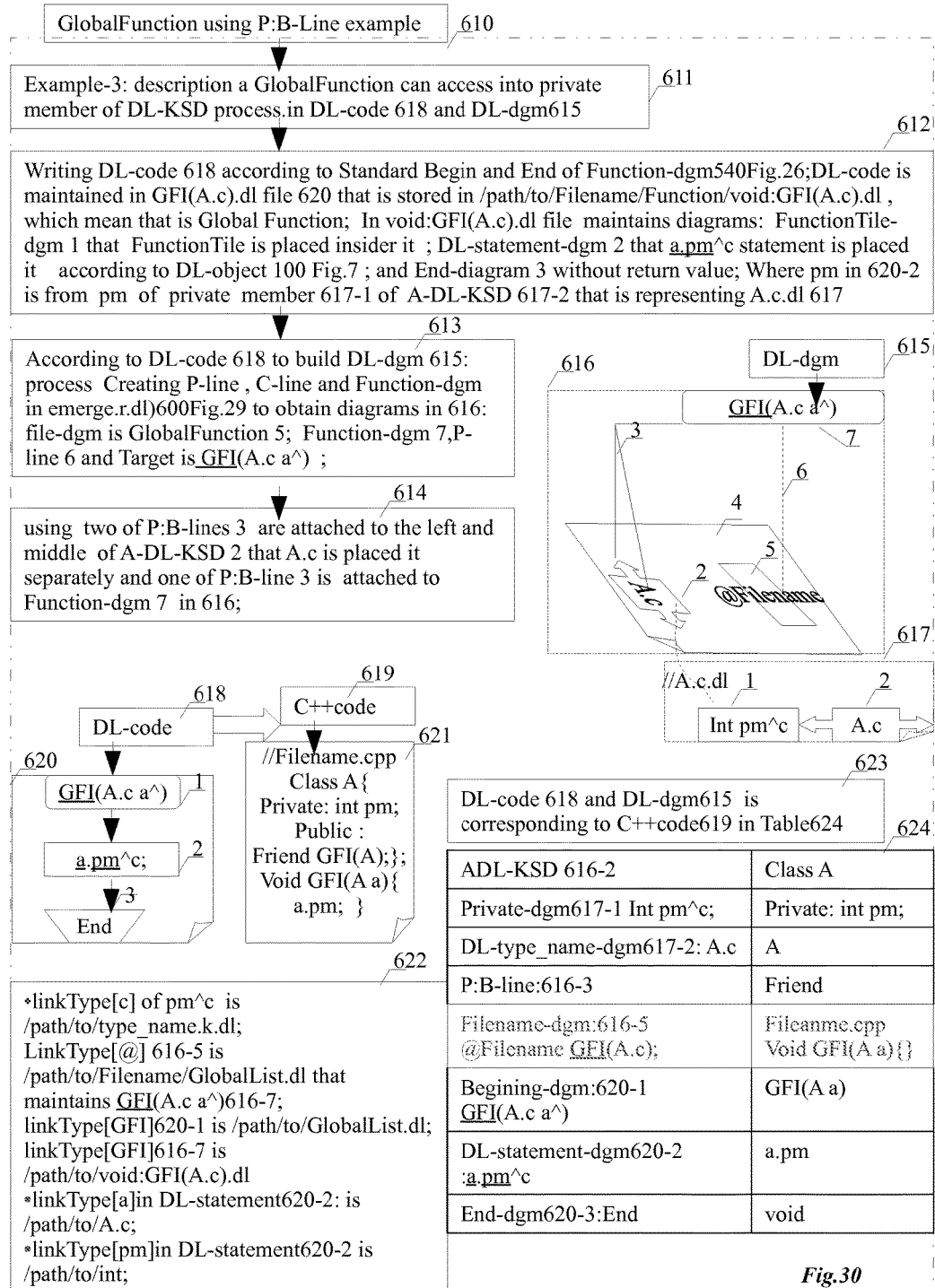
FIG. 30: illustrating a diagram that description Global Function using P:B-Line example.
Figure 31:
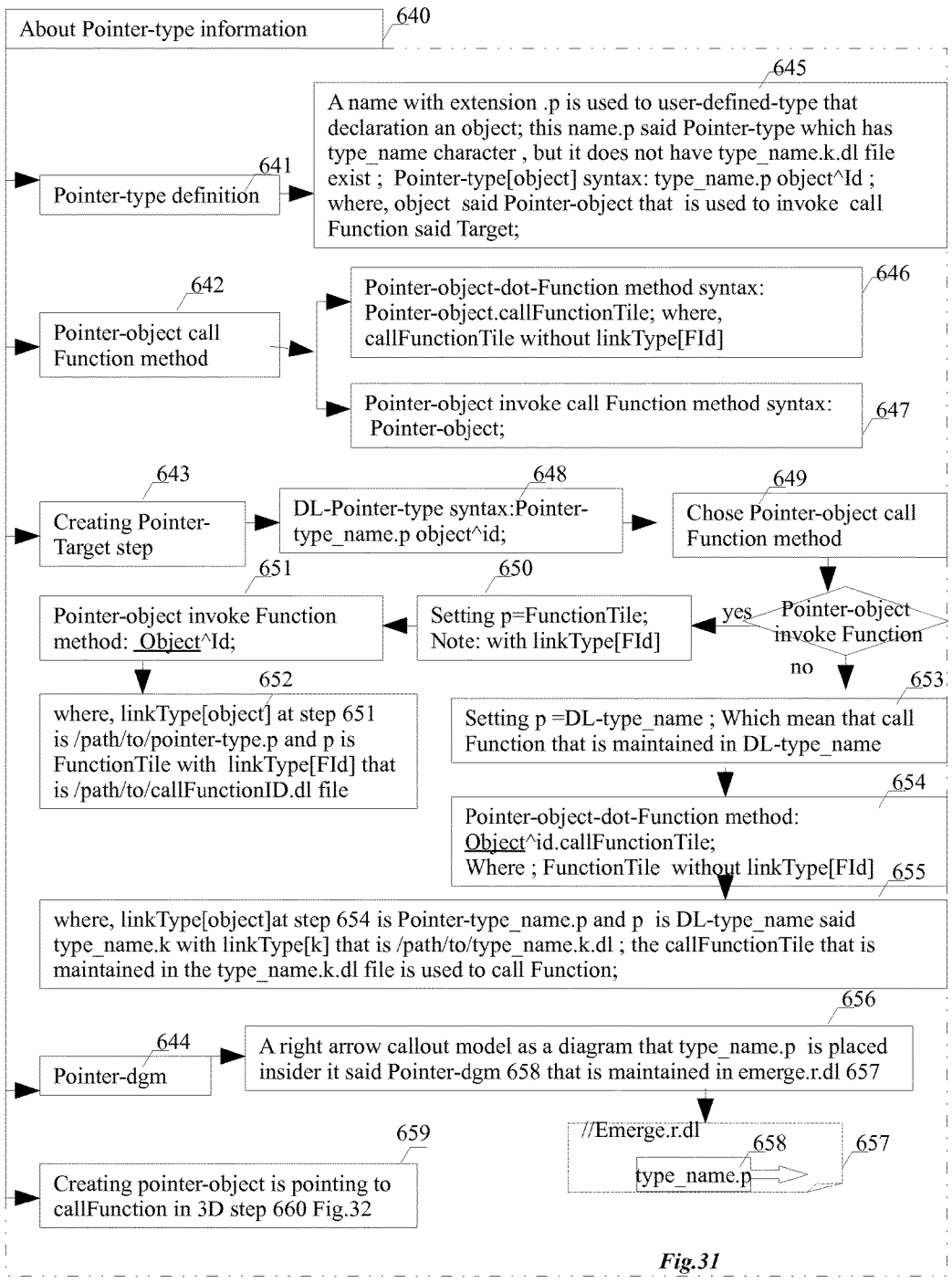
FIG. 31: illustrating a diagram that description About Pointer-type information.
Figure 32:
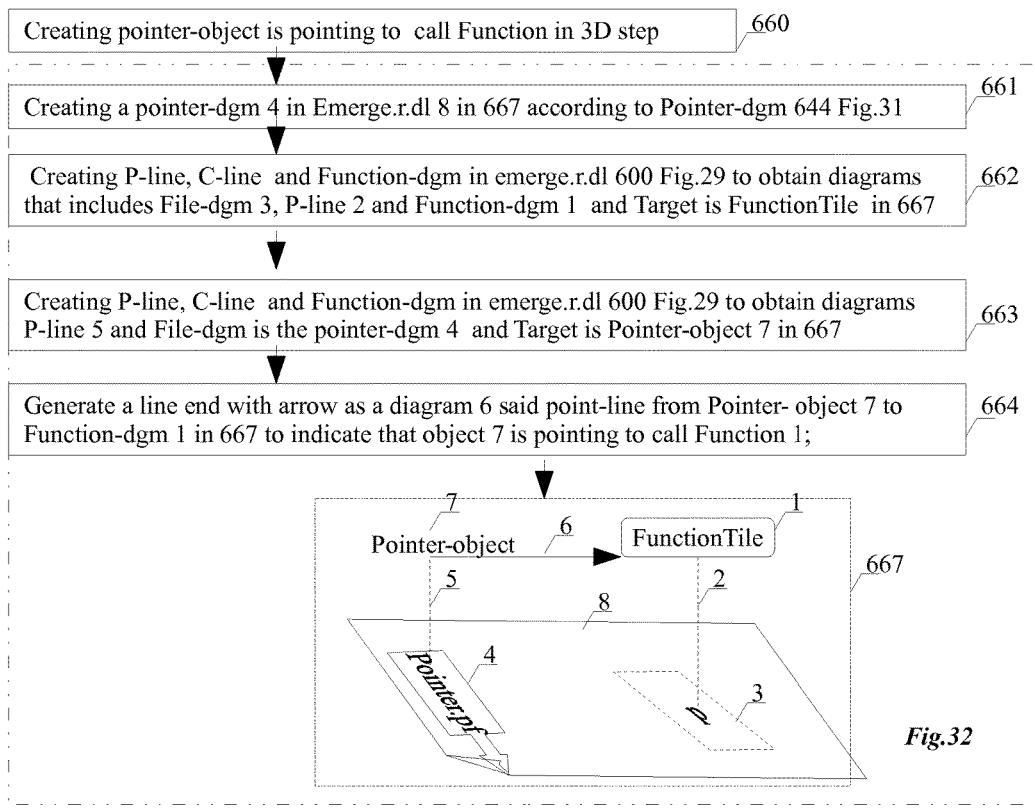
FIG. 32: illustrating a diagram that description Creating pointer-object is pointing to call Function step.

FIG. 27: illustrating a diagram that description Writing call Function step 570 in FIG. 27; asking yourself, you want to call Global Function step 571? if yes, call Global Function at step 575, then Going to GlobalList.dl to search call Function at step 576; Copy FId with linkType[FId] from FunctionTile in GlobalList.dl to be call Function at step 577 and then going to step 578; if no, call member Function at step 572; search DL-KSD in Emerge.r.dl and click .k in DL-type_name from DL-KSD to display type_name.k.dl file on the screen (not shown) at step 573; Copy FId with linkType[FId] from FunctionTile in type_name.k.dl file to be call Function at step 574 and then going to step 578;

at step 578: process creating call DL-object[input]List 590 FIG. 28 to update DL-object in parameter list of call Function;

FIG. 28: illustrating a diagram that description Creating callDL-object[input]List 590 FIG. 28; Writing input value of callFunction as a DL-object[input-value] according to DL-object 100 FIG. 7 at step 591; DL-object[input-vlaue] is to be parameters of callFunction at step 592; Example: creating DL-object[value] in callFunction with DL-type[arg] in FunctionTile at step 593: FunctionTile is $\underline{Fid}$(int arg^) at step 594; DL-code: callFunction at step 595 is Fid(3); at step 596; where, linkType[FId] is /path/to/FunctionID.dl 597 which is providing to compile programming to process call Function with input value 3 with linkType[3] that is int 598;

wherein a dash line with a dash Rectangle model as a diagram that linkType[ ] information is placed insider it; which is used to explains linkType[ ] information;

FIG. 29: illustrating a diagram that description Creating P-line, C-line and Function-dgm in emerge.r.dl 600 in FIG. 29; Converting Text to diagram in 3D to disquisition DL-KSD information in Emerge.r.dl file 607-5 at step 601; creating a dash-line as a diagram that Perpendicular to File-dgm (i.e., 3 and 4) said P-line (i.e., 1 and 2) in 607; using P-line is indication that Target (i.e., Target_1 and Target_2) has relationship with File that is placed insider File-dgm separately at step 602; wherein File-dgm with dash line Rectangle model as a diagram that File is placed insider it; which mean that File is un-definition so that the File-dgm is un-definition diagram; To define File and File-dgm (i.e, 3 and 4 in 607), according to Target that is from the file with file-dgm at step 603; Target is placed on the top of P-line such as Target-1 and Target-2 at step 604; Target is FunctionTile? If yes, Creating a Rectangle and Round model as diagram that copying FunctionTile from the File-dgm is placed insider it said Function-dgm 607-7; and Target-2 is placed insider it; where, Target-2 is FunctionTile at step 605; then going to step 606; if no, just going to step 606;

at step 606: creating a dash-line between two Targets said Connection-line (C-line) 607-6 That is indication that the relationship between Target_1 and Target_2 in 607;

FIG. 30: illustrating a diagram that description Global-Function using P:B-Line example 610 in FIG. 30; Example-3: description a GlobalFunction can access into private member of DL-KSD process in DL-code 618 and DL-dgm 615 at step 611; Writing DL-code 618 according to Standard Begin and End of Function-dgm 540 FIG. 26; DL-code 618 is maintained in void:GFI(A.c).dl file 620 that is stored in /path/to/Filename/Function/void:GFI(A.c).dl, which mean that is Global Function; In void:GFI(A.c).dl file 620 maintains diagrams: FunctionTile-dgm 1 that FunctionTile is placed insider it; DL-statement-dgm 2 that a.pm^c statement is placed it, and End-diagram without return value 3 according to DL-object 100 FIG. 7; Where pm in 620-2 is from pm of private member 617-1 of A-DL-KSD 617-2 that is representing A.c.dl 617 at step 612;

According to DL-code 618 to build DL-dgm 615: process Creating P-line, C-line and Function-dgm in emerge.r.dl) 600 FIG. 29 to obtain diagrams in 616: file-dgm is GlobalFunction 5; Function-dgm 7, P-line 6 and Target is $\underline{GFI}$(A.c a^) at step 613;

Using two of P:B-lines 3 are attached to the left and middle of A-DL-KSD 2 that A.c is placed it separately and one of P:B-line 3 is attached to Function-dgm 7 in 616 at step 614;

LinkType[ ] information in DL at step 622:

linkType[c] of pm^c is /path/to/type_name.k.dl;

LinkType[@] 616-5 is /path/to/Filename/GlobalList.dl that maintains $\underline{GFI}$(A.c a^)616-7; linkType[GFI] 620-1 is /path/to/GlobalList.dl;

linkType[GFI]616-7 is /path/to/void:GFI(A.c).dl linkType[a]in DL-statement 620-2: is /path/to/A.c;

linkType[pm]in DL-statement 620-2 is /path/to/int;

DL-code 618 and DL-dgm 615 is corresponding to C++ code 619 in Table 624 at step 623; From example we see that P:B-line 616-3 is corresponding to C++ Friend keyword;

From Example-3; It is verify that the text-to-diagram is help programmer and developer understand DL-code more convenience and easy way;

FIG. 31: illustrating a diagram that description About Pointer-type information 640 in FIG. 31;

Pointer-type definition 641: A name with extension .p is used to user-defined-type that declaration an object; this name.p said Pointer-type which has type_name character, but it does not have type_name.k.dl file exist; Pointer-type[object] syntax: type_name.p object^Id; where, object said Pointer-object that is used to invoke a target said Pointer-Target at step 645;

Pointer-object call Function method 642: a) Pointer-object-dot-Function method syntax: Pointer-object.callFunctionTile; where, callFunctionTile without linkType[FId] at step 646; b) Pointer-object invoke Function method syntax: Pointer-at step 647;

Creating Pointer-Target step 643: DL-Pointer-type[object] syntax: Pointer-type_name.p object^Id at step 648; Chose Pointer-object call Function method at step 649; Pointer-object invoke Function? If yes, Setting p=FunctionTile; Note: with linkType[FId] of FunctionTile in 650; and Pointer-object invoke Function method: " Object^Id;" at step 651; where, linkType [object] in 651 is /path/to/pointer-type.p and p is FunctionTile that include linkType[FId] that is /path/to/callFunctionID.dl file at step 652; compile programming use linkType[object] to obtain linkType[FId] to process call FunctionID, which mean that it is pointer-object invoked call Function;

if no, Setting p=DL-type_name; Which mean that call Function that is maintained in DL-type_name at step 653; Pointer-object-dot-Function method: Object^id.callFunctionTile; Where, FunctionTile without linkType[FId] at step 654; where, linkType[object] 654 is Pointer-type_name.p and p is DL-type_name said type_name.k with linkType[k] that is /path/to/type_name.k.dl; the callFunctionTile that is maintained in the type_name.k.dl file at step 655; compile programming uses linkType[object] to obtain linkType[k] and searching FunctionTile from type_name.k.dl and callFunctionTile is equality, the getting linkType[FId] from searching FunctionTile that is /path/to/callFunctionID.dl file; Therefore, the compile programming process callFunction according to callFunctonID.dl file in DL; in other words, the Pointer-object is used to access into FunctionTile from member-dgm of type_name.k.dl file;

Pointer-dgm 644: A right arrow callout model as a diagram that type_name.p is placed insider it said Pointer-dgm 658 that is maintained in emerge.r.dl 657 at step 656;

Creating pointer-object is pointing to call Function in 3D step 660 FIG. 32 at step 659;

FIG. 32: illustrating a diagram that description Creating pointer-object is pointing to call Function step 660 in FIG. 32; Creating a pointer-dgm 4 in Emerge.r.dl 8 in 667 according to Pointer-dgm 644 FIG. 31 at step 661; Creating P-line, C-line and Function-dgm in emerge.r.dl 600 FIG. 29 to obtain diagrams that includes File-dgm 3, P-line 2 and Function-dgm 1 and Target is FunctionTile in 667 at step 662; Creating P-line, C-line and Function-dgm in emerge.r.dl 600 FIG. 29 to obtain diagrams P-line 5 and File-dgm is the pointer-dgm 4 and Target is Pointer-object 7 in 667 at step 663, Generate a line end with arrow as a diagram 6 said point-line from Pointer-object 7 to Function-dgm 1 in 667 to indicate that object 7 is pointing to call Function 1 at step 664.

FIG. 33: illustrating a diagram that description Pointer-object-dot-Function method example 710 in FIG. 33; Using Pointer-object-dot-Function method to call overridden Function example: according to differently type_name.k.dl (i.e., A.c, B.c, and D.c) that maintained overridden FunctionTile (i.e., print( )) at step 711; Creating Pointer-Target step 643 FIG. 31 to writing DL-code 720 at step 712; In DL-code 720 that is main( ).dl file 724 maintains code in diagrams that includes beginning-dgm 722, DL-statement-dgm 723 and MainEnd-dgm 725 at step 713; In DL-statement-dgm 723: 1:Pointer.p[ ] pt[]^;/*p[] and pt[] are used to store multi-DL-type_name*/ 2:p[ ]={A.c, B.c, D.c};/*p[ ] store DL-type_name: A.c, B.c, D.c*/ 3:For(int i=0; i<3; i++){cout<< pt[i]^ print( );/*using loop to call print( ) according to linkType[pt[i]]*/ at step 714; linkType[pt[0]] is A.c that linkType[c] is /path/to/A.c.dl file that maintains call FunctionTile: print( ); with linkType[print] is /path/to/void:print( ).dl; compile programming process void print( ) with void:print( ).dl file; Similarly, linkType[pt[1]] is B.c and call print( ) from B.c and linkType[pt[2]] is D.c and call print( ) from D.c at step 715;

Creating pointer-object is pointing to call Function step 660 FIG. 32 to creating DL-dgm 728 in 727 pt[]^ 5, point-line 13 from pt[ ] to p[i] (i from 0 to 2) to Function-dgm 727-1 at step 716;

Using DL-code 720 and DL-dgm 728 are corresponding to C++ code 721 in Table 718:

From the Table 718, we see that the pointer-type[object] is corresponding to C++ virtual keywords of Function;

From this example, it is verify that the Pointer-type's character has same with C++ virtual keyword characters; and it has advantages that the text transformation to DL-dgm that exploit text information; Therefor, it is achieve to purpose that text-to-model and model-to-model to text formation in DL; DL-code 720 and DL-dgm 728 and C++ code 721 shown CONTINUE-1 FIG. 33 at step 719 which mean next page is belonged to FIG. 33;

FIG. 34: illustrating a diagram that description Pointer-object invoked Function method example 740 FIG. 34; Using Pointer-object invoked Function method to call FunctionTile that is Global FunctionTile (i.e., Func(int x^)) at step 741; Creating Pointer-Target step 643 FIG. 31 to writing DL-code 750 at step 742;

In DL-code 750 display DL-statement-dgm751: 1:pointer.p pt^; /*pointer.p declares an object said pt*/ 2: p= Func(int x^);/*p is callFunction said Func(int x^), linkType[Func] is /path/to/void:Func(int).dl*/3:pt^(3); /*call Func(3); /*linkType[pt] is pointer.p and linkType[3] is int*/ at step 743;

where, compile programming uses linkType[pt] to obtain pointer.p and p is Func(int x^) with linkType[FId] that is /path/to/void:Func(int).dl; compile programing use value 3 to process Func program that is maintained in void:Func(int).dl; so that is achieve that the using Pointer-object invoked call Function in DL;

Creating pointer-object is pointing to call Function step 660 FIG. 32 to creating DL-dgm 754 that maintains diagram 755; point-line 6 from pt(3)^ 5 to Function-digm 1 that Func(int x^) is placed insider it at step 744;

Using DL-code 750 and DL-dgm 754 are corresponding to C++ code 752 in Table 746 at step 745; From the Table we see that the pointer-object invoked Function method is corresponding to C++ Pointer Function;

In DL-dgm 754 in 755:

the pt(3)^ 5 has a point-line 6 that point to Function-dgm 1 that Func(int x^) is placed insider it; which mean that the pt(3)^ invokes Func(int x) with x=3 value;

and the P-line 2 is indication that Func(int x^) 1 is from Filename-dgm that @ with linkType[@] that is /path/to/GlobalList.dl; in other words, the Func(int x^) is maintained in GlobalList.dl;

and the P-line 3 is indication that the pt(3)^ 5 is DL-object that is declared with its Pointer-type said pointer.p 4;

From this example, it is verify that the Pointer-type's character has same with C++ Pointer Function characters; it is verify that text-to-model transformation is exist in DL;

The invention claimed is:

1. A Diagram Language (DL) for computer programming, comprising:

at least one function performing mathematical calculations, string manipulations, character manipulations, input operations, output operations, error checking and other related support computing operations; wherein the at least one function provides a group of capabilities comprising:

at least one structure definition allowing a programmer to modularize a program;

at least one ID (identifier) representing location of an object in a structure definition;

at least one member representing a variable that is associated with the structure definition;

at least one Member_Function representing a function of the at least one function that is associated with a structure definition of said at least one structure definition;

at least one Member-diagram indicating the at least one member inserted into the at least one member-diagram, thereby creating a Member-diagram, comprising at least one diagram comprising Members that are into the at least one diagram;

at least one extension .k representing a structure definition;

at least one extension .dl indicating a code in a file written with the DL;

at least one type_name.k representing a programming-defined object type from an object oriented programming language;

at least one DL-type_name-diagram representing a declaration statement of the structure definition; creating the DL-typename-diagram comprises the steps of: creating a diagram in which the type name.k is placed within it;

in instances when the Member-diagram is attached to the DL-type_name-diagram indicating that the members are of the type name.k;

at least one Access Specific representing access Members;

at least one DL-type_name.k.dl file wherein, the FileName of the DL-type_name.k.dl comprises a type name.k and an extension .dl and provides a user-definition structure statement in the DL, wherein the DL-type_name.k.dl maintains only a first DL-type__name-diagram and the Member-diagram if the Member-diagram is attached to DL-type_name-diagram;

at least one DL-KSD diagram representing the DL-type_name.k.dl and creating a DL-KSD diagram comprising the step of: creating a diagram, wherein the type name.k is placed into said diagram; wherein k has a linking that connects with the DL-type_name.k.dl file;

at least one object representing a variable in the structure definition;

at least one DL-object comprising its own ID;

at least one DL-type representing a structure type that is used to declare variables and declare a DL-object statement, comprising: a DL-type and a DL-object;

at least one typeUnderline representing the DL-type;

at least one object, wherein said object is for accessible Members in order to access an Access Specific field and wherein the object comprises another object comprising a typeUnderline;

at least one FunctionArgument representing an argument in the Function, wherein the FunctionArgument comprises the DL-type and a DL-object pair;

at least a DL-typeList that comprises at least one DL-type;

at least one FunctionID representing a Function's individuality in the programming, wherein the FunctionID comprises a return-value-type:function-name(DL-typeList);

at least one underline representing a connection to the File;

at least one FunctionTile representing the Function's individuality in the DL-type_name.k.dl file and the FunctionTile comprises an underline;

at least one Beginning-diagram representing a step to start to process the Function programming, wherein the FunctionTile comprising the underline is placed into the at least one Beginning-diagram;

at least one processing-diagram representing the step to continue processing a next diagram if any next diagram exists;

at least one Body-diagram representing a function statement, wherein the Function statement is inserted into the processing-diagram;

at least one End-diagram representing the step to End processing of the Function programming;

at least one GlobalList representing public information, wherein a GlobalList of the at least one GlobalList comprises a declaration statement that comprises the DL-type, the DL-object and the FunctionTile comprising an underline;

at least one FunctionID.dl file representing Function structure information, wherein the FunctionID.dl file comprises: the at least one Beginning-diagram, the at least one processing-diagram and the at least one End-diagram;

at least one fromModel representing the Object in the DL-KSD, that can access the Members in the Member-diagram of another DL-KSD;

at least one toModel representing the Members in the DL-KSD that are accessed by the Object that comprises at least one individual fromModel from said at least one fromModel;

at least one Access-diagram representing a step to access Members from one DL-KSD from the Member-diagram of another DL-KSD;

at least one Perpendicular-diagram representing a variable that belongs to the part of the DL-KSD.

2. The Diagram Language (DL) for computer programming claim 1, wherein the Access Specific field represents the Members are public.

3. The Diagram Language (DL) for computer programming claim 1, wherein the Access Specific field represents the Members are private.

4. The Diagram Language (DL) for computer programming claim 1, wherein the Access Specific field represents the Members are protected.

5. The Diagram Language (DL) for computer programming in claim 1 wherein a FunctionTile with an underline that links to said DL-type_name.k.dl file.

6. The Diagram Language (DL) for computer programming in claim 1, wherein the End-diagram represents a End of Function programming without a return value.

7. The Diagram Language (DL) for computer programming in claim 1, wherein the End-diagram represents an End of Function programming with a return value.

8. The Diagram Language (DL) for computer programming in claim 1, wherein the Access-diagram comprises a diagram connection with one fromModel and one toModel, wherein the fromModel is attached to a middle of the DL-KSD and the toModel is attached to the Member-diagram of another DL-KSD in order to access the Access-Specific field.

9. The Diagram Language (DL) for computer programming claim 1, wherein the object comprises the location of said DL-type_name.k.dl file.

10. The Diagram Language (DL) for computer programming claim 1, wherein the object comprises the location of said GlobalList file.

11. The Diagram Language (DL) for computer programming claim 1, wherein the object comprises the location of said FunctionID file.

* * * * *